(12) United States Patent
Lee et al.

(10) Patent No.: US 12,175,093 B2
(45) Date of Patent: Dec. 24, 2024

(54) MEMORY DEVICE, STORAGE DEVICE, AND COMPUTING SYSTEM INCLUDING MEMORY DEVICE AND STORAGE DEVICE

(71) Applicant: SAMSUNG ELECTRONICS CO., LTD., Suwon-si (KR)

(72) Inventors: Kyunghan Lee, Suwon-si (KR); Seongsik Hwang, Suwon-si (KR); Chon Yong Lee, Suwon-si (KR); Jae-Gon Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/131,646

(22) Filed: Apr. 6, 2023

(65) Prior Publication Data
US 2023/0376216 A1 Nov. 23, 2023

(30) Foreign Application Priority Data
May 23, 2022 (KR) .................. 10-2022-0063111

(51) Int. Cl.
*G06F 3/06* (2006.01)
*G06F 12/1009* (2016.01)

(52) U.S. Cl.
CPC .......... *G06F 3/0619* (2013.01); *G06F 3/0656* (2013.01); *G06F 3/0679* (2013.01); *G06F 12/1009* (2013.01)

(58) Field of Classification Search
CPC .............. G06F 3/06; G06F 12/10–19; G06F 12/02–2246; G06F 12/06–0638; G06F 2212/72–7201; G06F 2212/22–2228
See application file for complete search history.

(56) References Cited

U.S. PATENT DOCUMENTS

| | | | |
|---|---|---|---|
| 9,830,257 B1 | 11/2017 | Booth et al. | |
| 10,977,187 B2* | 4/2021 | Lee | G06F 3/0659 |
| 11,074,208 B1 | 7/2021 | Dastidar et al. | |
| 2009/0164702 A1* | 6/2009 | Kern | G06F 12/0246 |
| | | | 711/170 |
| 2011/0099325 A1 | 4/2011 | Roh et al. | |
| 2015/0278243 A1 | 10/2015 | Vincent et al. | |
| 2017/0003981 A1* | 1/2017 | Erez | G06F 3/0685 |
| 2017/0091042 A1 | 3/2017 | Chou et al. | |
| 2018/0136875 A1 | 5/2018 | Nimmagadda et al. | |
| 2019/0391747 A1 | 12/2019 | Sheperek et al. | |
| 2020/0042460 A1 | 2/2020 | Oh | |
| 2021/0200670 A1 | 7/2021 | Winterfeld et al. | |
| 2021/0311646 A1 | 10/2021 | Malladi et al. | |
| 2021/0311895 A1 | 10/2021 | Das Sharma | |

FOREIGN PATENT DOCUMENTS

KR 10-1713780 B1 3/2017
KR 10-2018-0054394 A 5/2018

* cited by examiner

*Primary Examiner* — Khoa D Doan
(74) *Attorney, Agent, or Firm* — Sughrue Mion, PLLC

(57) ABSTRACT

A memory device is provided. The memory device includes: a buffer memory; a nonvolatile backup memory; and a memory controller configured to: store map data corresponding to an external storage device in the buffer memory; provide, in response to a request from the external storage device, an address pair corresponding to the request, from among address pairs of the map data, to the external storage device; and back up, in response to a sudden power-off event, the map data to the nonvolatile backup memory.

11 Claims, 21 Drawing Sheets

MEMORY DEVICE, STORAGE DEVICE, AND COMPUTING SYSTEM INCLUDING MEMORY DEVICE AND STORAGE DEVICE

CROSS-REFERENCE TO RELATED APPLICATION

This application claims priority under 35 U.S.C. § 119 to Korean Patent Application No. 10-2022-0063111 filed on May 23, 2022, in the Korean Intellectual Property Office, the disclosure of which is incorporated by reference herein in its entirety.

BACKGROUND

The present disclosure relates to an electronic device, and more particularly, to a memory device managing map data, a storage device, and a computing device including the memory device and the storage device.

A storage device, such as a solid state drive, may include a NAND flash memory. A system of logical block addresses used in a host is different from a system of physical block addresses of the NAND flash memory of the storage device. For this reason, the storage device may perform translation between a logical block address of the host and a physical block address of the NAND flash memory by using map data in which the logical block address and the physical block address are mapped.

As the capacity of the NAND flash memory increases, the size of the map data also increases. As such, there is a need for a storage device which for efficiently manages a large amount of map data.

SUMMARY

Embodiments provide a storage device managing a large amount of map data without a high-capacity buffer memory dedicated for use in the storage device, a computing device including a storage device and a memory device, and an operating method of the computing device.

According to an aspect of an embodiment, a memory device includes: a buffer memory; a nonvolatile backup memory; and a memory controller configured to: store map data corresponding to an external storage device in the buffer memory; provide, in response to a request from the external storage device, an address pair corresponding to the request, from among address pairs of the map data, to the external storage device; and back up, in response to a sudden power-off event, the map data to the nonvolatile backup memory.

According to an aspect of an embodiment, a storage device includes: a nonvolatile memory configured to store user data and map data; and a storage controller configured to: read the map data from the nonvolatile memory; send the map data read from the nonvolatile memory to an external memory device; request an address pair, for access to the nonvolatile memory, from among address pairs of the map data to the external memory device from the external memory device; and based on power being turned on after a sudden power-off, request the map data from the external memory device.

According to an aspect of an embodiment, a computing system includes: a host; a storage device comprising a nonvolatile memory storing user data and map data; a memory device comprising a buffer memory and a nonvolatile backup memory; and a bus connected to the host, the storage device and the memory device. The host is configured to, based on power being turned on, identify whether a sudden power-off event has occurred in the storage device, and whether the sudden power-off event has occurred in the memory device.

BRIEF DESCRIPTION OF DRAWINGS

The above and other aspects and features of the present disclosure will be more clearly understood from the following description of embodiments, taken in conjunction with the accompanying drawings.

DETAILED DESCRIPTION

Below, embodiments will be described with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure.

Figure 1:
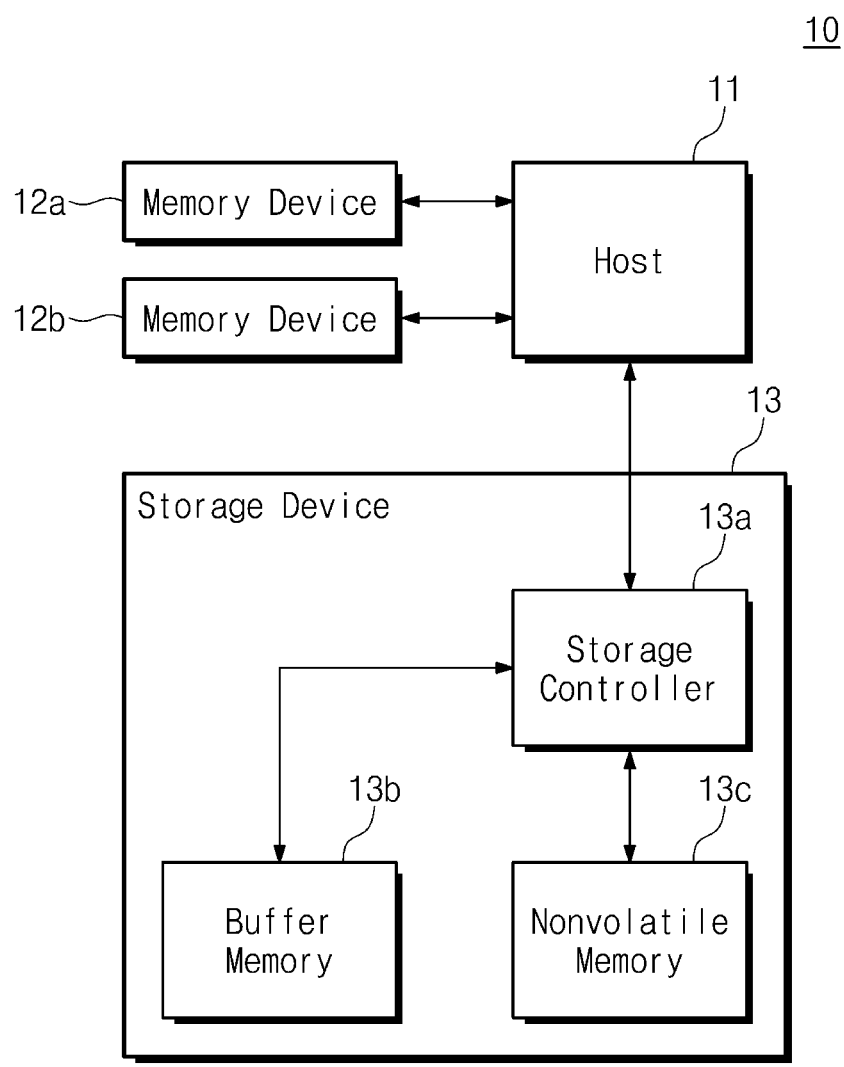
FIG. 1 is a block diagram illustrating a computing system including a storage device according to an embodiment.

FIG. 1 is a block diagram illustrating a computing system including a storage device. Referring to FIG. 1, a computing system 10 may include a host 11, a plurality of memory devices 12a and 12b, and a storage device 13. The host 11 may control an overall operation of the computing system 10. The plurality of memory devices 12a and 12b may be used as a working memory or a system memory of the host 11.

The storage device 13 may include a storage controller 13a, a buffer memory 13b, and a nonvolatile memory 13c. Under control of the host 11, the storage controller 13a may store data in the nonvolatile memory 13c or may send data stored in the nonvolatile memory 13c to the host 11.

The buffer memory 13b may store a variety of information necessary for the storage device 13 to operate. For example, the storage controller 13a may manage data stored in the nonvolatile memory 13c by using map data. The map data may include information about relationship between a logical block address managed by the host 11 and a physical block address of the nonvolatile memory 13c. For example, the map data may include an address pair each including a logical block address and a physical block address. Each of the address pairs may map one logical block address and one physical block address. The storage controller 13a may load and use the map data onto the buffer memory 13b.

In an embodiment, the buffer memory 13b may be a high-speed memory such as a DRAM. As the capacity of the nonvolatile memory 13c increases, the size of necessary map data may increase. However, because the capacity of the buffer memory 13b included in the single storage device 13 is limited, the buffer memory 13b may not be able to store the increased map data that is needed due to the increase in the capacity of the nonvolatile memory 13c.

Figure 2:
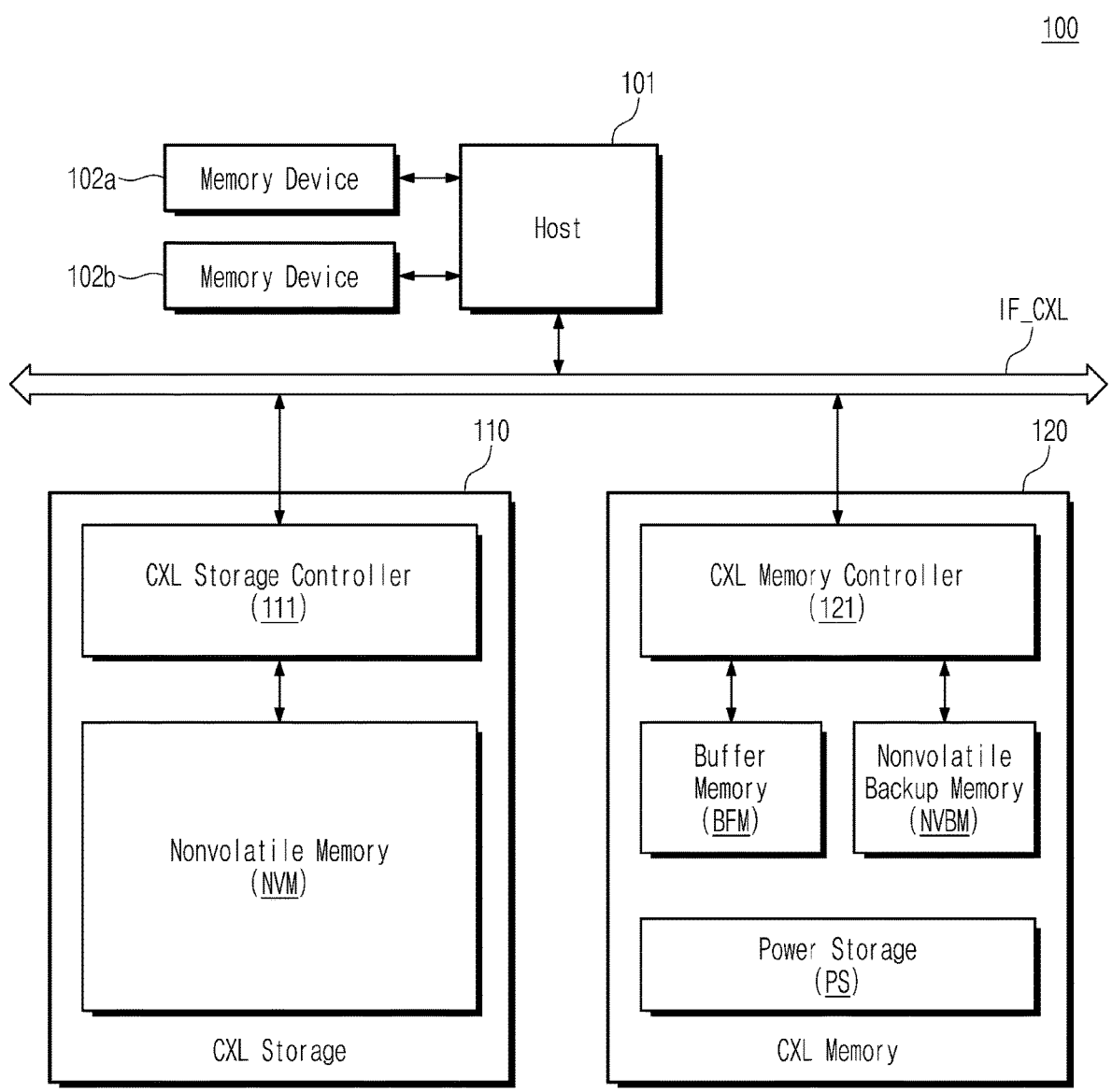
FIG. 2 is a block diagram illustrating a computing system according to an embodiment.

FIG. 2 is a block diagram illustrating a computing system to which a storage system according to an embodiment is applied. Referring to FIG. 2, a computing system 100 may include a host 101, a plurality of memory devices 102a and 102b, Compute eXpress Link (CXL) storage 110, and a CXL memory 120. In an embodiment, the computing system 100 may be included in user devices such as a personal computer, a laptop computer, a server, a media player, and a digital camera or automotive devices such as a navigation system, a black box, and an automotive electronic device/part. Alternatively, the computing system 100 may be a mobile system such as a mobile phone, a smartphone, a tablet personal computer (PC), a wearable device, a health care device, or an Internet of things (IoT) device.

The host 101 may control an overall operation of the computing system 100. In an embodiment, the host 101 may be one of various processors such as a central processing unit (CPU), a graphics processing unit (GPU), a neural processing unit (NPU), and a data processing unit (DPU). In an embodiment, the host 101 may include a single core processor or a multi-core processor.

The plurality of memory devices 102a and 102b may be used as a main memory or a system memory of the computing system 100. In an embodiment, each of the plurality of memory devices 102a and 102b may be a dynamic random access memory (DRAM) device and may have the form factor of the dual in-line memory module (DIMM). However, embodiments are not limited thereto. For example, the plurality of memory devices 102a and 102b may include a nonvolatile memory such as a flash memory, a phase change RAM (PRAM), a resistive RAM (RRAM), or a magnetic RAM (MRAM).

The plurality of memory devices 102a and 102b may each include an interface to directly communicate with the host 101, such as a Double Data Rate (DDR) interface. In an embodiment, the host 101 may include a memory controller configured to control the plurality of memory devices 102a and 102b. However, embodiments are not limited thereto. For example, the plurality of memory devices 102a and 102b may communicate with the host 101 through various interfaces.

The CXL storage 110 may include a CXL storage controller 111, a nonvolatile memory NVM. Under control of the host 101, the CXL storage controller 111 may store data in the nonvolatile memory NVM or may send data stored in the nonvolatile memory NVM to the host 101. In an embodiment, the nonvolatile memory NVM may be a NAND flash memory, but embodiments are not limited thereto.

The CXL memory 120 may include a CXL memory controller 121, a buffer memory BFM, a nonvolatile backup memory NVBM and power storage PS. Under control of the host 101, the CXL memory controller 121 may store data in the buffer memory BFM or the nonvolatile backup memory NVBM or may send data stored in the buffer memory BFM to the host 101. In an embodiment, the buffer memory BFM may be a DRAM, but embodiments are not limited thereto.

When utilizing the computing system 100, a sudden power-off (SPO) event can arise. The SPO event may arise because of various events including local area power-off, malfunction of power elements of the computing system 100, etc. The SPO event may arise critical problems such as data loss, system panic due to the data loss, etc. In order to prevent such problems, when the sudden power-off event occurs, the CXL memory controller 121 may back up data requiring backup from among the data stored in the buffer memory BFM to the nonvolatile backup memory NVBM. The nonvolatile backup memory NVBM may include one of various nonvolatile memories such as a NAND flash memory, a phase-change memory, a magnetic memory, a ferroelectric memory, and a resistive memory.

In an embodiment, the host 101, the CXL storage 110, and the CXL memory 120 may be configured to share the same interface. For example, the host 101, the CXL storage 110, and the CXL memory 120 may communicate with each other through a CXL interface IF_CXL. In an embodiment, the CXL interface IF_CXL may indicate a low-latency and high-bandwidth link that supports coherency, memory access, and dynamic protocol multiplexing of input and output protocols such that various connections between accelerators, memory devices, or various electronic devices are possible.

In an embodiment, unlike the storage device 13 of FIG. 1, the CXL storage 110 may not include a separate buffer memory for storing or managing map data. In this case, the CXL storage 110 may require a buffer memory for storing or managing the map data. In an embodiment, at least a partial area of the CXL memory 120 may be used as a buffer memory of the CXL storage 110. In this case, a mapping table that is managed by the CXL storage controller 111 of the CXL storage 110 may be stored in the CXL memory 120. For example, at least a partial area of the CXL memory 120 may be allocated for a buffer memory of the CXL storage 110 (i.e., for a CXL storage-dedicated area) by the host 101.

In an embodiment, the CXL storage 110 may access the CXL memory 120 through the CXL interface IF_CXL. For example, the CXL storage 110 may store the mapping table in the allocated area of the CXL memory 120 or may read the mapping table from the allocated area of the CXL memory 120. Under control of the CXL storage 110, the CXL memory 120 may store data (e.g., the map data) in the buffer memory BFM or may send the data (e.g., the map data) stored in the buffer memory BFM to the CXL storage 110.

As described with reference to FIG. 1, a related storage device 13 stores and manages the map data by using the buffer memory 13b included therein. As the capacity of the storage device 13 increases, the size of the map data increase, which necessitates an increase in the capacity of the buffer memory 13b included in the storage device 13. However, there is a limitation on an increase in capacity due to the structure and physical characteristic of the buffer memory 13b included in the storage device 13.

In contrast, according to an embodiment, the CXL storage 110 may use at least a partial area of the CXL memory 120 placed outside the CXL storage 110 as a buffer memory. In this case, because the CXL memory 120 is implemented independently of the CXL storage 110, the CXL memory 120 may be implemented with a high-capacity memory. As such, even though the size of the map data increases due to an increase in the capacity of the CXL storage 110, the map data may be normally managed by the CXL memory 120.

In an embodiment, the storage controller 13a of the related storage device 13 communicates with the host 11 through the host interface such as Peripheral Component Interconnect Express (PCIe) or NVM Express (NVMe), and communicates with the buffer memory 13b through the memory interface such as a DDR interface or a Low-Power Double Data Rate (LPDDR) interface. That is, the storage controller 13a of the related storage device 13 communicates with the host 11 and the buffer memory 13b included therein, through different interfaces (i.e., heterogeneous interfaces).

In contrast, according to an embodiment, the CXL storage controller 111 of the CXL storage 110 may communicate with both the host 101 and the CXL memory 120 (i.e., a buffer memory) through the CXL interface IF_CXL. In this regard, the CXL storage controller 111 of the CXL storage 110 may communicate with the host 101 and the CXL memory 120 through a homogeneous interface or a common interface and may use a partial area of the CXL memory 120 as a buffer memory.

Below, for convenience of description, it is assumed that the host 101, the CXL storage 110, and the CXL memory 120 communicate with each other through the CXL interface IF_CXL. However, embodiments are not limited thereto. For example, the host 101, the CXL storage 110, and the CXL memory 120 may communicate with each other based on various computing interfaces complying with the following: GEN-Z protocol, NVLink protocol, Cache Coherent Interconnect for Accelerators (CCIX) protocol, and Open Coherent Accelerator Processor Interface (CAPI) protocol.

Figure 3:
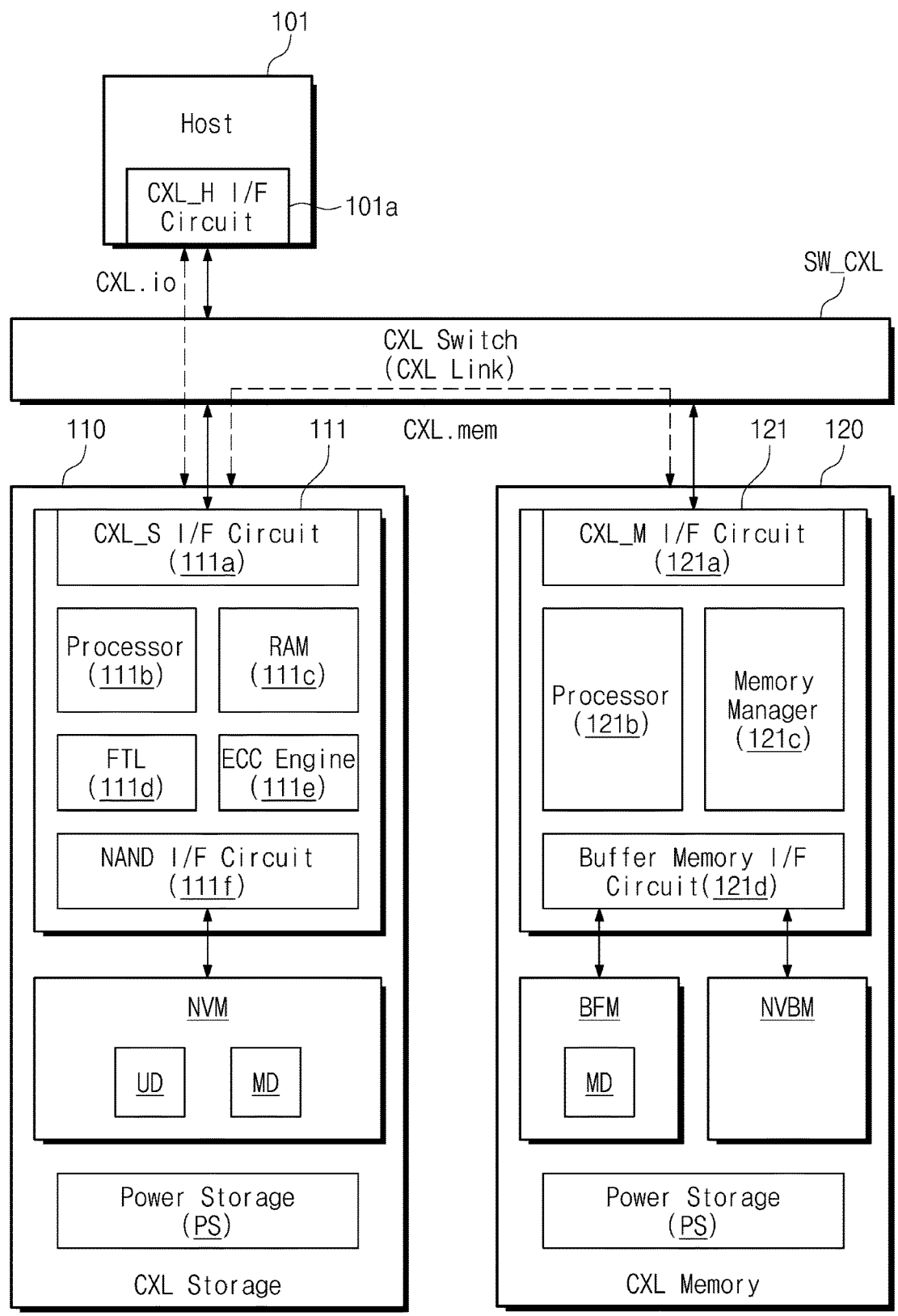
FIG. 3 is a block diagram illustrating components of a computing system in detail according to an embodiment.

FIG. 3 is a block diagram illustrating components of a computing system of FIG. 2 in detail, according to an embodiment. Referring to FIGS. 2 and 3, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate the communication between the host 101, the CXL storage 110, and the CXL memory 120. For example, when the host 101 and the CXL storage 110 communicate with each other, the CXL switch SW_CXL may be configured to send information, which is provided from the host 101 or the CXL storage 110, such as a request, data, a response, or a signal to the CXL storage 110 or the host 101. When the host 101 and the CXL memory 120 communicate with each other, the CXL switch SW_CXL may be configured to send information, which is provided from the host 101 or the CXL memory 120, such as a request, data, a response, or a signal to the CXL memory 120 or the host 101. When the CXL storage 110 and the CXL memory 120 communicate with each other, the CXL switch SW_CXL may be configured to send information, which is provided from the CXL storage 110 or the CXL memory 120, such as a request, data, a response, or a signal to the CXL memory 120 or the CXL storage 110.

The host 101 may include a CXL host interface circuit 101a. The CXL host interface circuit 101a may communicate with the CXL storage 110 or the CXL memory 120 through the CXL switch SW_CXL.

In an embodiment, a configuration of the CXL storage 110 may be different from configurations of related storages. For example, the related storage device (e.g., an SSD including a DRAM buffer) stores and manages map data in the DRAM buffer included in the related storage device. In this case, a high-capacity DRAM buffer for storing the map data may be included in the related storage device. Alternatively, another type of related storage device (e.g., a DRAM-less SSD or a DRAM-less memory card) may store the entire map data in a nonvolatile memory (e.g., a NAND flash memory) included in the conventional storage device and loads and uses a portion of the map data onto an SRAM buffer. In this case, to load the map data, the nonvolatile memory, which has an operating speed lower than that of the DRAM buffer, is frequently accessed, thereby reducing the performance of operation.

In contrast, the CXL storage 110 according to the present disclosure may not include a separate DRAM buffer configured to store the map data. In this case, map data MD may be stored and managed in the CXL memory 120 placed outside the CXL storage 110. As will be described below, because the CXL memory 120 supports a fast operating speed, the CXL storage 110 may have the same performance as the related storage device (e.g., a storage device including a DRAM). In addition, because the CXL memory 120 is placed outside the CXL storage 110, a large amount of map data of the CXL storage 110 may be managed.

The CXL storage 110 may include the CXL storage controller 111 and the nonvolatile memory NVM. The CXL storage controller 111 may include a CXL storage interface circuit 111a, a processor 111b, a RAM 111c, a flash translation layer (FTL) 111d, an error correction code (ECC) engine 111e, and a NAND interface circuit 111f.

The CXL storage interface circuit 111a may be connected with the CXL switch SW_CXL. The CXL storage interface circuit 111a may communicate with the host 101 or the CXL memory 120 through the CXL switch SW_CXL.

The processor 111b may be configured to control an overall operation of the CXL storage controller 111. The RAM 111c may be used as a working memory or a buffer memory of the CXL storage controller 111. In an embodiment, the RAM 111c may be an SRAM and may be used as a read buffer and a write buffer for the CXL storage 110. In an embodiment, as will be described below, the RAM 111c may be configured to temporarily store the map data MD read from the CXL memory 120 or a portion of the map data MD.

The FTL 111d may perform various management operations for efficiently using the nonvolatile memory NVM. For example, the FTL 111d may perform address translation between a logical block address managed by the host 101 and a physical block address used in the nonvolatile memory NVM, based on the map data (or a mapping table). The FTL 111d may perform a bad block management operation for the nonvolatile memory NVM. The FTL 111d may perform a wear leveling operation for the nonvolatile memory NVM. The FTL 111d may perform a garbage collection operation for the nonvolatile memory NVM.

In an embodiment, the FTL 111d may be implemented in the form of hardware, firmware, or software, or in the form of a combination thereof. In the case where the FTL 111d is implemented in the form of firmware or software, program codes associated with the FTL 111d may be stored in the RAM 111c and may be driven by the processor 111b. In the case where the FTL 111d is implemented by hardware, hardware components configured to perform the above management operations may be implemented in the CXL storage controller 111.

The ECC engine 111e may perform error detection and correction on data read from the nonvolatile memory NVM. For example, the ECC engine 111e may generate parity bits for user data UD to be stored in the nonvolatile memory NVM, and the parity bits thus generated may be stored in the nonvolatile memory NVM together with the user data UD. When the user data UD are read from the nonvolatile memory NVM, the ECC engine 111e may detect and correct an error of the user data UD by using the parity bits read from the nonvolatile memory NVM together with the user data UD.

The NAND interface circuit 111f may control the nonvolatile memory NVM such that data are stored in the nonvolatile memory NVM or data are read from the nonvolatile memory NVM. In an embodiment, the NAND interface circuit 111f may be implemented to comply with the standard protocol such as a toggle interface or Open NAND Flash Interface (ONFI). For example, the nonvolatile memory NVM may include a plurality of NAND flash devices; in the case where the NAND interface circuit 111f is implemented based on the toggle interface, the NAND interface circuit 111f may communicate with the plurality of NAND flash devices through a plurality of channels. The plurality of NAND flash devices may be connected with the plurality of channels through a multi-channel, multi-way structure.

The NAND interface circuit 111f may send a chip enable signal /CE, a command latch enable signal CLE, an address latch enable signal ALE, a read enable signal /RE and a write enable signal /WE to the plurality of NAND flash devices through the plurality of channels. The NAND interface circuit 111f and each NAND flash device may exchange a data signal DQ and a data strobe signal DQS through each channel.

TABLE 1

| /CE | CLE | ALE | /WE | /RE | DQS | DQx | MODE |
|-----|-----|-----|-----|-----|-----|-----|------|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 shows operating modes of a NAND flash device according to a state of each signal. Referring to Table 1, while the NAND flash device receives a command CMD or an address ADDR or receives/outputs data "DATA", the chip enable signal /CE maintains a low level "L". During a command input mode, the NAND interface circuit 111f may control signal lines such that the command latch enable signal CLE has a high level "H", the address latch enable signal ALE has the low level "L", the write enable signal /WE toggles between the high level "H" and the low level "L" and the read enable signal /RE has the high level "H". During the command input mode, the NAND interface circuit 111f may send the command CMD to the NAND flash device through data signals DQx in synchronization with the rising edge ↑ of the write enable signal /WE. The NAND flash device may identify the command CMD from the data signals DQx in response to the rising edge ↑ of the write enable signal /WE. During an address input mode, the NAND interface circuit 111f may control signal lines such that the command latch enable signal CLE has the low level "L", the address latch enable signal ALE has the high level "H", the write enable signal /WE toggles between the high level "H" and the low level "L", and the read enable signal /RE has the high level "H". During the address input mode, the NAND interface circuit 111f may send the address ADDR to the NAND flash device through the data signals DQx in synchronization with the rising edge ↑ of the write enable signal /WE. The NAND flash device may identify the address ADDR from the data signals DQx in response to the rising edge ↑ of the write enable signal /WE. In an embodiment, the address ADDR may be a value corresponding to a physical block address of the NAND flash device.

During a data input mode, the NAND interface circuit 111f may control signal lines such that the command latch enable signal CLE has the low level "L", the address latch enable signal ALE has the low level "L", the write enable signal /WE has the high level "H", the read enable signal /RE has the high level "H", and the data strobe signal DQS toggles between the high level "H" and the low level "L". During the data input mode, the NAND interface circuit 111f may send the data "DATA" to the NAND flash device through the data signals DQx in synchronization with the rising edge ↑ and the falling edge ↑ of the data strobe signal DQS. The NAND flash device may identify the data "DATA" from the data signals DQx in response to the rising edge ↑ and the falling edge ↑ of the data strobe signal DQS.

During a data output mode, the NAND interface circuit 111f may control signal lines that the command latch enable signal CLE has the low level "L", the address latch enable signal ALE has the low level "L", the write enable signal /WE has the high level "H", and the read enable signal /RE toggles between the high level "H" and the low level "L". During the data output mode, the NAND flash device may generate the data strobe signal DQS toggling between the high level "H" and the low level "L" in response to the read enable signal /RE. The NAND flash device may send the data "DATA" to the NAND interface circuit 111f through the data signals DQx in synchronization with the rising edge ↑ and the falling edge ↓ of the data strobe signal DQS. The NAND interface circuit 111f may identify the data "DATA" from the data signals DQx in response to the rising edge ↑ and the falling edge ↓ of the data strobe signal DQS.

The toggle interface described above is an example, and embodiments are not limited thereto.

The nonvolatile memory NVM may store or output the user data UD under control of the CXL storage controller 111. The nonvolatile memory NVM may store or output the map data MD under control of the CXL storage controller 111. In an embodiment, the map data MD stored in the nonvolatile memory NVM may include mapping information corresponding to the entire user data UD stored in the nonvolatile memory NVM. The map data MD stored in the nonvolatile memory NVM may be stored in the CXL memory 120 in the initialization operation of the CXL storage 110.

The CXL memory 120 may include the CXL memory controller 121, the buffer memory BFM, the nonvolatile backup memory NVBM, and power storage PS. The CXL memory controller 121 may include a CXL memory interface circuit 121a, a processor 121b, a memory manager 121c, and a buffer memory interface circuit 121d.

The CXL memory interface circuit 121a may be connected with the CXL switch SW_CXL. The CXL memory interface circuit 121a may communicate with the host 101 or the CXL storage 110 through the CXL switch SW_CXL.

The processor 121b may be configured to control an overall operation of the CXL memory controller 121. The memory manager 121c may be configured to manage the buffer memory BFM and the nonvolatile backup memory NVBM. For example, the memory manager 121c may be configured to translate a memory address (e.g., a logical address or a virtual address) from the host 101 or the CXL storage 110 into a physical address for the buffer memory BFM. In an embodiment, the memory address that is an address for managing a storage area of the CXL memory 120 may be a logical address or a virtual address that is designated and managed by the host 101. When the sudden power-off (SPO) event occurs, the memory manager 121c may control the buffer memory BFM and the nonvolatile backup memory NVBM such that data (e.g., the map data MD) requiring backup from among the data of the buffer memory BFM are backed up to the nonvolatile backup memory NVBM.

The buffer memory interface circuit 121d may control the buffer memory BFM such that data are stored in the buffer memory BFM or data are read from the buffer memory BFM. In an embodiment, the buffer memory interface circuit 121d may be implemented to comply with the standard protocol for the buffer memory BFM, such as a DDR interface or an LPDDR interface. The buffer memory interface circuit 121d may be implemented to comply with the standard protocol for the nonvolatile backup memory NVBM, such as a toggle interface or an ONFI.

Under control of the CXL memory controller 121, the buffer memory BFM may store data or may output the stored data. In an embodiment, the buffer memory BFM may be configured to store the map data MD that are used in the CXL storage 110. The map data MD may be transferred from the CXL storage 110 to the CXL memory 120 when the computing system 100 is initialized or the CXL storage 110 is initialized.

When the sudden power-off (SPO) event occurs, the nonvolatile backup memory NVBM may store data (e.g., the map data MD) requiring backup from among the data present in the buffer memory BFM. When the power is again supplied, the nonvolatile backup memory NVBM may be used to recover (or update) the data requiring backup.

When the sudden power-off (SPO) event occurs, the power storage PS may supply the power that is necessary for the memory manager 121c to back up the data (e.g., the map data MD) requiring backup from among the data of the buffer memory BFM to the nonvolatile backup memory NVBM. The power storage PS may include a capacitor such as a super capacitor or a tantalum capacitor.

As described above, the CXL storage 110 according to an embodiment may store the map data MD, which are necessary to manage the nonvolatile memory NVM, in the CXL memory 120 connected through the CXL switch SW_CXL (or the CXL interface IF_CXL). Afterwards, when the CXL storage 110 performs the read operation according to a request of the host 101, the CXL storage 110 may read at least a portion of the map data MD from the CXL memory 120 through the CXL switch SW_CXL (or the CXL interface IF_CXL) and may perform the read operation based on the map data MD thus read. Alternatively, when the CXL storage 110 performs the write operation according to a request of the host 101, the CXL storage 110 may perform the write operation on the nonvolatile memory NVM and may update the map data MD. In this case, the updated map data MD may be first stored in the RAM 111c of the CXL storage controller 111, and the map data MD stored in the RAM 111c may be transferred to the buffer memory BFM of the CXL memory 120 through the CXL switch SW_CXL (or the CXL interface IF_CXL), so as to be updated in the buffer memory BFM.

In an embodiment, at least a partial area of the buffer memory BFM of the CXL memory 120 may be allocated for a dedicated area for the CXL storage 110, and the remaining area may be used as an area that is capable of being accessed by the host 101.

In an embodiment, the host 101 and the CXL storage 110 may communicate with each other by using an input/output protocol, such as CXL.io. The CXL.io may be a PCIe-based non-coherency input/output protocol. The host 101 and the CXL storage 110 may exchange user data or variety of information with each other by using the CXL.io.

In an embodiment, the CXL storage 110 and the CXL memory 120 may communicate with each other by using a memory access protocol, such as CXL.mem. The CXL.mem may be a memory access protocol that supports memory access. The CXL storage 110 may access a partial area (e.g., an area where the map data MD are stored or a CXL storage-dedicated area) of the CXL memory 120 by using the CXL.mem.

In an embodiment, the host 101 and the CXL memory 120 may communicate with each other by using CXL.mem. The host 101 may access the remaining area (e.g., the remaining area other than the area where the map data MD are stored or the remaining area other than the CXL storage-dedicated area) of the CXL memory 120 by using the CXL.mem.

The above access types including CXL.io and CXL.mem are provided as an example, and embodiments are not limited thereto.

In an embodiment, the CXL storage 110 and the CXL memory 120 may be installed in a CXL interface-based physical port (e.g., a PCIe physical port). In an embodiment, the CXL storage 110 and the CXL memory 120 may be implemented based on the E1.S, E1.L, E3.S, E3.L, or PCIe AIC (CEM) form factor. Alternatively, the CXL storage 110 and the CXL memory 120 may be implemented based on the U.2 form factor, the M.2 form factor, various different types of PCIe-based form factors, or various different types of small form factors. As will be described with reference to FIG. 14, the CXL storage 110 and the CXL memory 120 may be implemented with various types of form factors, and may support a function of a hot-plug capable of being installed in (or added to) or removed from the physical port.

Figure 4:
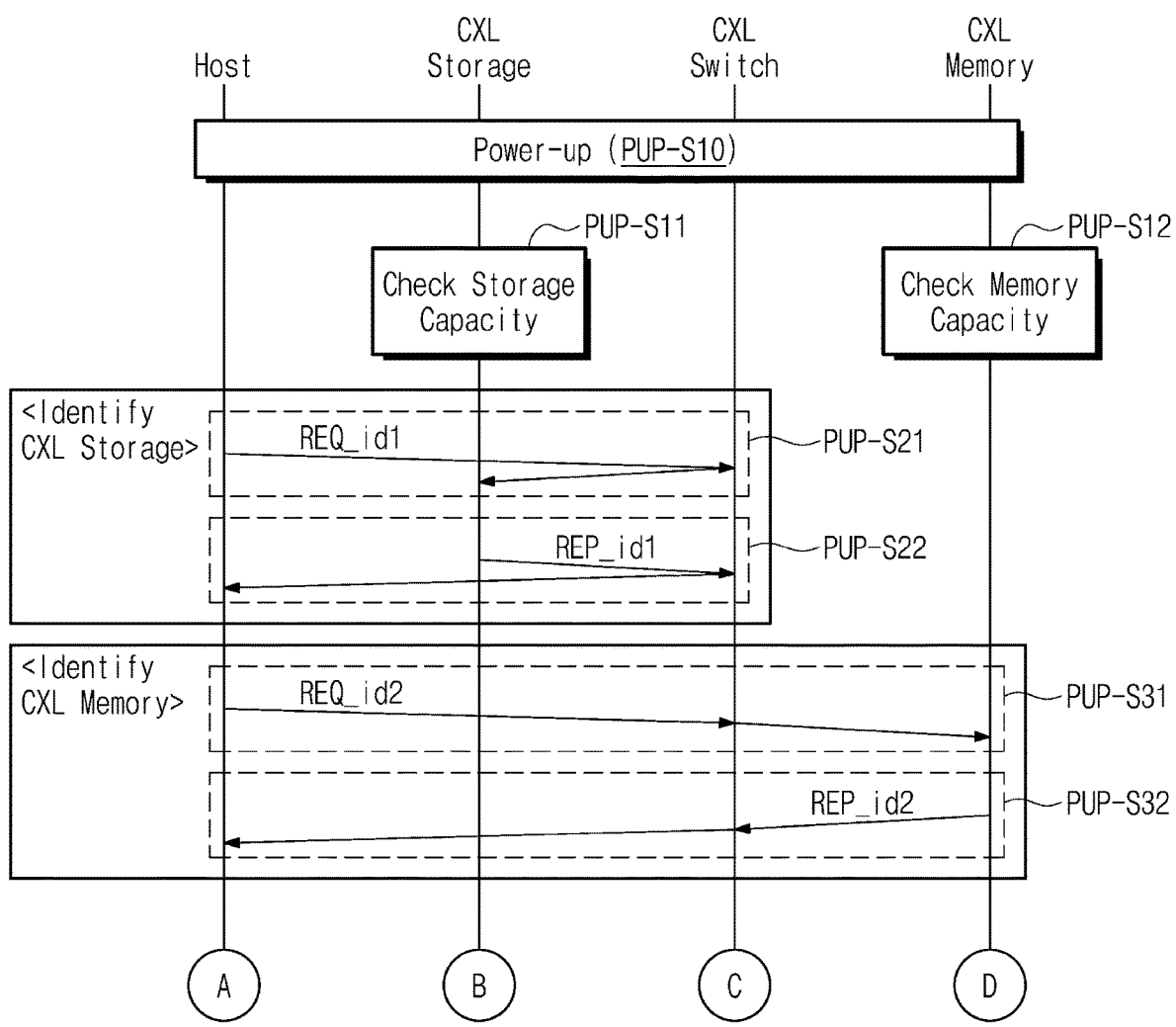
FIG. 4 is a flowchart illustrating a first phase of an initialization operation or a power-up operation of a computing system, according to an embodiment.

FIG. 4 is a flowchart illustrating a first phase of an initialization operation or a power-up operation of a computing system of FIG. 3, according to an embodiment. Referring to FIGS. 3 and 4, in operation PUP-S10, the computing system 100 may be powered up. When the computing system 100 is powered up, the host 101 may send information about power-up or initialization start to the CXL storage 110, the CXL switch SW_CXL, and the CXL memory 120. In response to the power-up or initialization start information, each of the CXL storage 110, the CXL switch SW_CXL, and the CXL memory 120 may perform an individual initialization operation.

In operation PUP-S11, the CXL storage 110 may check a storage capacity (i.e., a capacity of the nonvolatile memory NVM). For example, the CXL storage 110 may check the storage capacity of the nonvolatile memory NVM in response to the information about power-up or initialization start.

In operation PUP-S12, the CXL memory 120 may check a memory capacity (i.e., a capacity of the buffer memory BFM). For example, the CXL memory 120 may check the capacity of the buffer memory BFM in response to the power-up or initialization start information.

The host 101 may recognize information of the CXL storage 110 through operation PUP-S21 and operation PUP-S22. For example, in operation PUP-S21, the host 101 may issue a first device information request REQ_id1 for recognizing device information of the CXL storage 110 through the CXL host interface circuit 101*a*. The first device information request REQ_id1 may be transferred to the CXL switch SW_CXL. The CXL switch SW_CXL may transfer the first device information request REQ_id1 to the CXL storage 110 targeted for the first device information request REQ_id1.

In operation PUP-S22, the CXL storage 110 may output a first device information response REP_id1 through the CXL storage interface circuit 111*a* in response to the first device information request REQ_id1 received from the CXL switch SW_CXL. The first device information response REP_id1 may be transferred to the CXL switch SW_CXL. The CXL switch SW_CXL may transfer the first device information response REP_id1 to the host 101 targeted for the first device information response REP_id1.

The host 101 may identify the device information of the CXL storage 110 in response to the first device information response REP_id1 received from the CXL switch SW_CXL. In an embodiment, the first device information response REP_id1 may include information about a device type and a storage capacity of the CXL storage 110.

The host 101 may recognize information of the CXL memory 120 through operation PUP-S31 and operation PUP-S32. For example, in operation PUP-S31, the host 101 may issue a second device information request REQ_id2 for recognizing device information of the CXL memory 120 through the CXL host interface circuit 101*a*. The second device information request REQ_id2 may be transferred to the CXL switch SW_CXL. The CXL switch SW_CXL may transfer the second device information request REQ_id2 to the CXL memory 120 targeted for the second device information request REQ_id2.

In operation PUP-S32, the CXL memory 120 may output a second device information response REP_id2 through the CXL memory interface circuit 121*a* in response to the second device information request REQ_id2 received from the CXL switch SW_CXL. The second device information response REP_id2 may be transferred to the CXL switch SW_CXL. The CXL switch SW_CXL may transfer the second device information response REP_id2 to the host 101 targeted for the second device information response REP_id2.

The host 101 may identify the device information of the CXL memory 120 in response to the second device information response REP_id2 received from the CXL switch SW_CXL. In an embodiment, the second device information response REP_id2 may include information about a device type and a storage capacity of the CXL memory 120.

As described above, the host 101 may identify the information about the device types (e.g., a storage type and a memory type) and capacities of the CXL storage 110 and the CXL memory 120 through operation PUP-S21 to operation PUP-S32.

After identifying the CXL storage 110 and the CXL memory 120 in the first phase, the host 101 may determine whether the sudden power-off (SPO) event has occurred. Reference signs A, B, C, and D of flowcharts in FIGS. 4 and 11 may be respectively connected to reference signs A, B, C, and D of a flowchart in FIG. 5.

Figure 5:
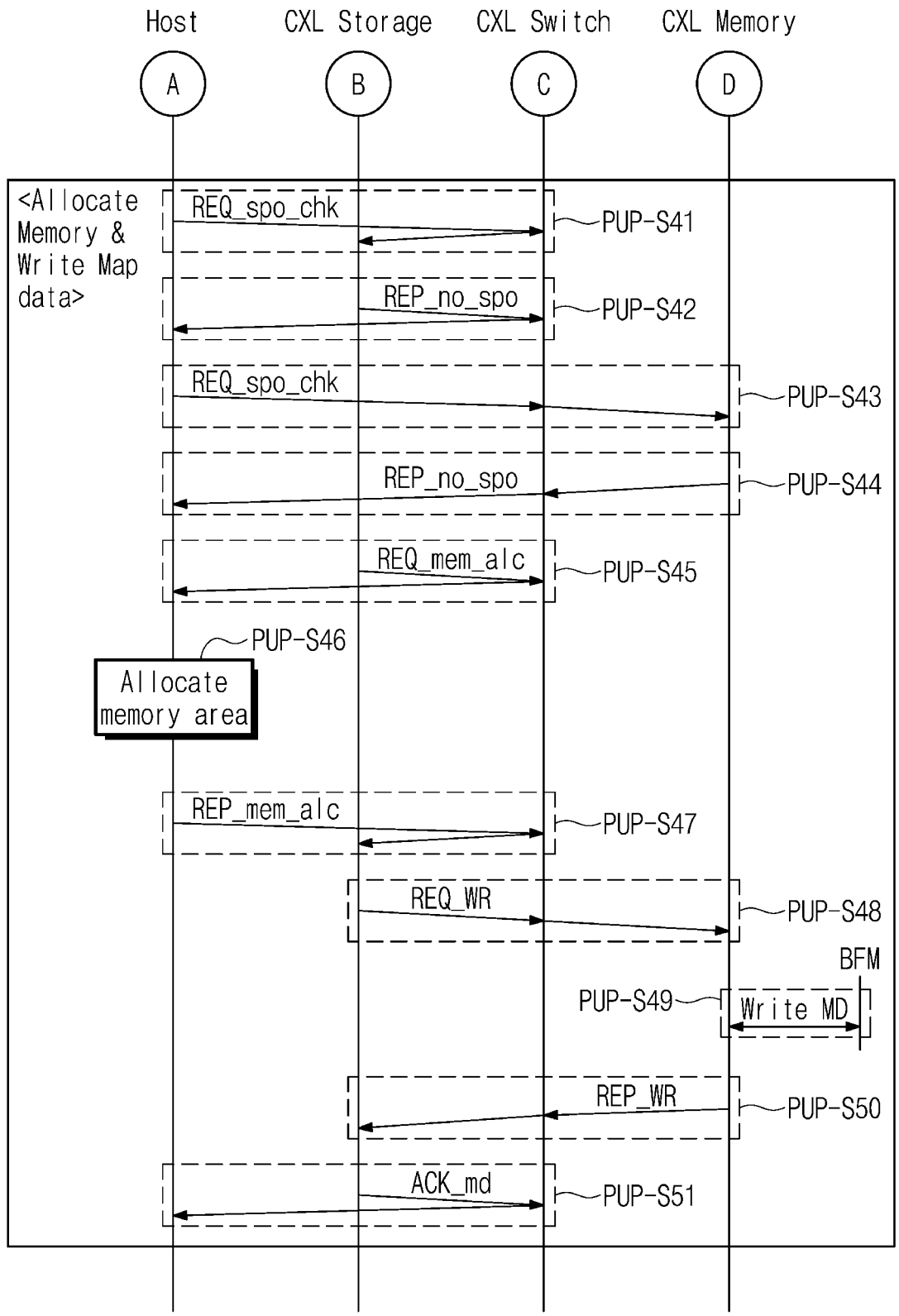
FIG. 5 is a flowchart illustrating a second phase of initialization of a computing system performed when a sudden power-off event does not occur, according to an embodiment.

FIG. 5 is a flowchart illustrating a second phase of initialization of a computing system performed when a sudden power-off (SPO) event does not occur, according to an embodiment. The reference signs A, B, C, and D of the flowchart in FIG. 4 may be respectively connected to the reference signs A, B, C, and D of the flowchart in FIG. 5.

Referring to FIGS. 3, 4, and 5, in operation PUP-S41, the host 101 may send, to the CXL storage 110, a request REQspo_chk for checking whether the sudden power-off (SPO) event has occurred. In operation PUP-S42, the CXL storage 110 may send, to the host 101, a response REP_no_spo providing notification that the sudden power-off (SPO) event has not occurred. The host 101 may identify that the CXL storage 110 has not experienced the sudden power-off (SPO), based on the response REP_no_spo.

In operation PUP-S43, the host 101 may send, to the CXL memory 120, the request REQspo_chk for checking whether the sudden power-off (SPO) event has occurred. In operation PUP-S44, the CXL memory 120 may send, to the host 101, the response REP_no_spo providing notification that the sudden power-off (SPO) event has not occurred. The host 101 may identify that the CXL memory 120 has not experienced the sudden power-off (SPO), based on the response REP_no_spo.

When the sudden power-off (SPO) has not occurred, it may be unnecessary to recover the map data MD. The host 101 may allocate at least a partial area of the CXL memory 120 for an area dedicated for the CXL storage 110 through operation PUP-S45 to operation PUP-S51. For example, in operation PUP-S45, the CXL storage 110 may output a memory allocation request REQ_mem_alc through the CXL storage interface circuit 111*a*. The memory allocation request REQ_mem_alc may be transferred to the CXL switch SW_CXL. The CXL switch SW_CXL may transfer the memory allocation request REQ_mem_alc to the host 101. In an embodiment, the memory allocation request REQ_mem_alc may refer to an allocation request for an area, which is to be used as a dedicated area of the CXL storage 110, from among areas of the CXL memory 120.

In operation PUP-S46, the host 101 may allocate at least a partial area of the CXL memory 120 for the dedicated area of the CXL storage 110 in response to the memory allocation request REQ_mem_alc. For example, the host 101 may determine a buffer capacity required by the CXL storage 110 based on the storage capacity of the CXL storage 110. The host 101 may allocate the area of the CXL memory 120, which corresponds to the determined buffer capacity, for the dedicated area of the CXL storage 110.

In operation PUP-S47, the host 101 may output a memory allocation response REP_mem_alc through the CXL host interface circuit 101*a*. The memory allocation response REP_mem_alc may be transferred to the CXL switch SW_CXL. The CXL switch SW_CXL may transfer the memory allocation response REP_mem_alc to the CXL storage 110 targeted for the memory allocation response REP_mem_alc. In an embodiment, the memory allocation response REP_mem_alc may include information about a device identifier of the CXL memory 120 and a memory address (e.g., a logical address range or a virtual address range) of an area of the CXL memory 120, which is allocated for a dedicated area of the CXL storage 110.

The CXL storage 110 may identify the area of the CXL memory 120, which is dedicated for the CXL storage 110, based on the memory allocation response REP_mem_alc.

In operation PUP-S48, the CXL storage 110 may output a write request REQ_WR through the CXL storage interface circuit 111a. The write request REQ_WR may be transferred to the CXL switch SW_CXL. The CXL switch SW_CXL may transfer the write request REQ_WR to the CXL memory 120 targeted for the write request REQ_WR. The CXL memory 120 may perform the write operation in response to the write request REQ_WR.

In operation PUP-S49, the CXL memory 120 may write the map data MD transferred from the CXL storage 110 in the buffer memory BFM. In operation PUP-S50, the CXL memory 120 may output, through the CXL memory interface circuit 121a, a write response REP_WR providing notification that the write request is completed. The CXL switch SW_CXL may transfer the write response REP_WR to the CXL storage 110 targeted for the write response REP_WR. The CXL storage 110 may recognize that the write operation is completely performed on the CXL memory 120, in response to the write response REP_WR.

In an embodiment, the write request REQ_WR may refer to a request for storing the map data MD present in the nonvolatile memory NVM of the CXL storage 110 in the dedicated area of the CXL memory 120. That is, the write request REQ_WR may include address information about the map data MD and the dedicated area. Through operation PUP-S48, operation PUP-S49, and operation PUP-S50, the map data MD present in the CXL storage 110 may be stored in the dedicated area of the CXL memory 120.

In operation PUP-S51, the CXL storage 110 may output acknowledge information ACK_md through the CXL storage interface circuit 111a. The CXL switch SW_CXL may transfer the acknowledge information ACK_md to the host 101. In response to the acknowledge information ACK_md, the host 101 may recognize that the CXL storage 110 stores the map data MD in the CXL memory 120. Afterwards, the host 101, the CXL storage 110, and the CXL memory 120 may perform a normal operation (e.g., a read operation or a write operation).

Figure 6:
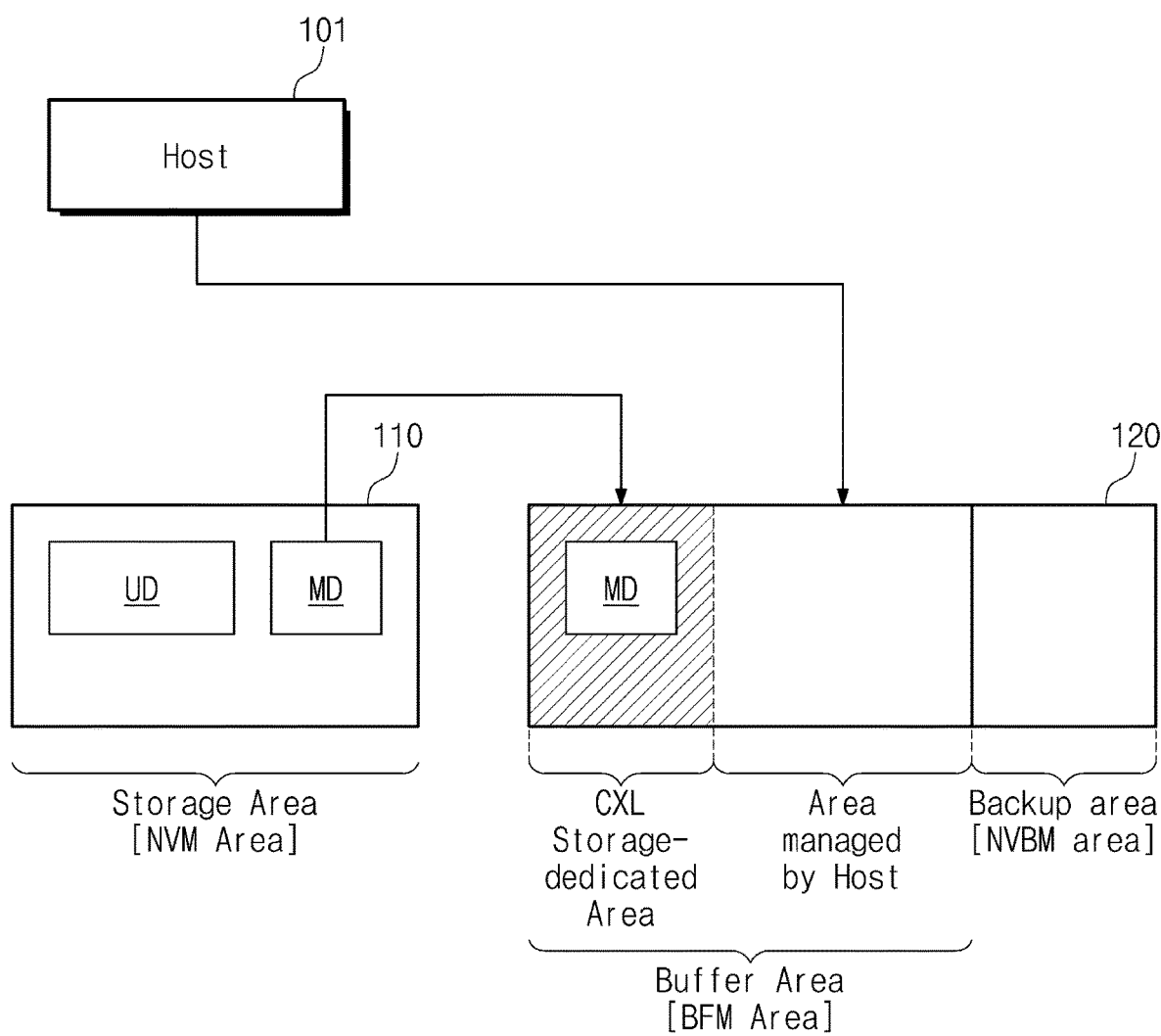
FIG. 6 is a diagram for describing an operation in which a computing system stores map data, according to an embodiment.

FIG. 6 is a diagram for describing an operation in which a computing system stores map data. For convenience of description and for brevity of drawing, components of the host 101, the CXL storage 110, and the CXL memory 120 are conceptually illustrated, and some components are omitted.

Referring to FIGS. 3 to 6, the host 101 may allocate a partial area of the CXL memory 120 for a dedicated area of the CXL storage 110. In this case, the dedicated area of the CXL memory 120 may be accessed by the CXL storage 110 and may be used to store map data of the CXL storage 110.

For example, as illustrated in FIG. 6, the nonvolatile memory NVM of the CXL storage 110 may store the user data UD and the map data MD. As described above, because the CXL storage 110 does not include a separate buffer memory, the CXL storage 110 may require a buffer area in which the map data MD are to be stored. According to an embodiment, the map data MD of the CXL storage 110 may be stored in a partial area (e.g., a dedicated area allocated by the host 101) of the CXL memory 120. In this case, the dedicated area of the CXL memory 120 may be accessed by the CXL storage 110 through the CXL switch SW_CXL.

In an embodiment, the remaining area of the CXL memory 120, which is not allocated, other than the dedicated area, may be an area that is accessible by the host 101 or is managed by the host 101. In this case, the host 101 may access the remaining area of the buffer memory BFM in the CXL memory 120 through the CXL switch SW_CXL. In an embodiment, the remaining area of the CXL memory 120, which is not allocated for the dedicated area, may be used as a memory expander.

The area of the nonvolatile backup memory NVBM in the CXL memory 120 may not be recognized by the host 101. The area of the nonvolatile backup memory NVBM in the CXL memory 120 may be used for the purpose of backing up data (e.g., the map data MD) requiring backup from among the data present in the area of the buffer memory BFM in the CXL memory 120.

As described above, according to the request of the CXL storage 110, the host 101 may allocate at least a partial area of the CXL memory 120 for the dedicated area of the CXL storage 110. In this case, the CXL storage 110 may access the area of the buffer memory BFM in the CXL memory 120, which is allocated for the dedicated area, and the host 101 may access the remaining area of the buffer memory BFM in the CXL memory 120 (i.e., the remaining area other than the dedicated area thus allocated). In an embodiment, both the access of the CXL storage 110 to the CXL memory 120 and the access of the host 101 to the CXL memory 120 may be performed through the same interface (e.g., a CXL interface or a CXL switch).

As described above, the nonvolatile backup memory NVBM may be used to back up data (e.g., the map data MD) requiring backup from among the data present in the buffer memory BFM of the CXL memory 120, that is used after (e.g., as a part of recovering from) the sudden power-off (SPO). Accordingly, even though the map data are managed outside the CXL storage 110, the map data may be prevented from being lost due to the sudden power-off (SPO).

Figure 7:
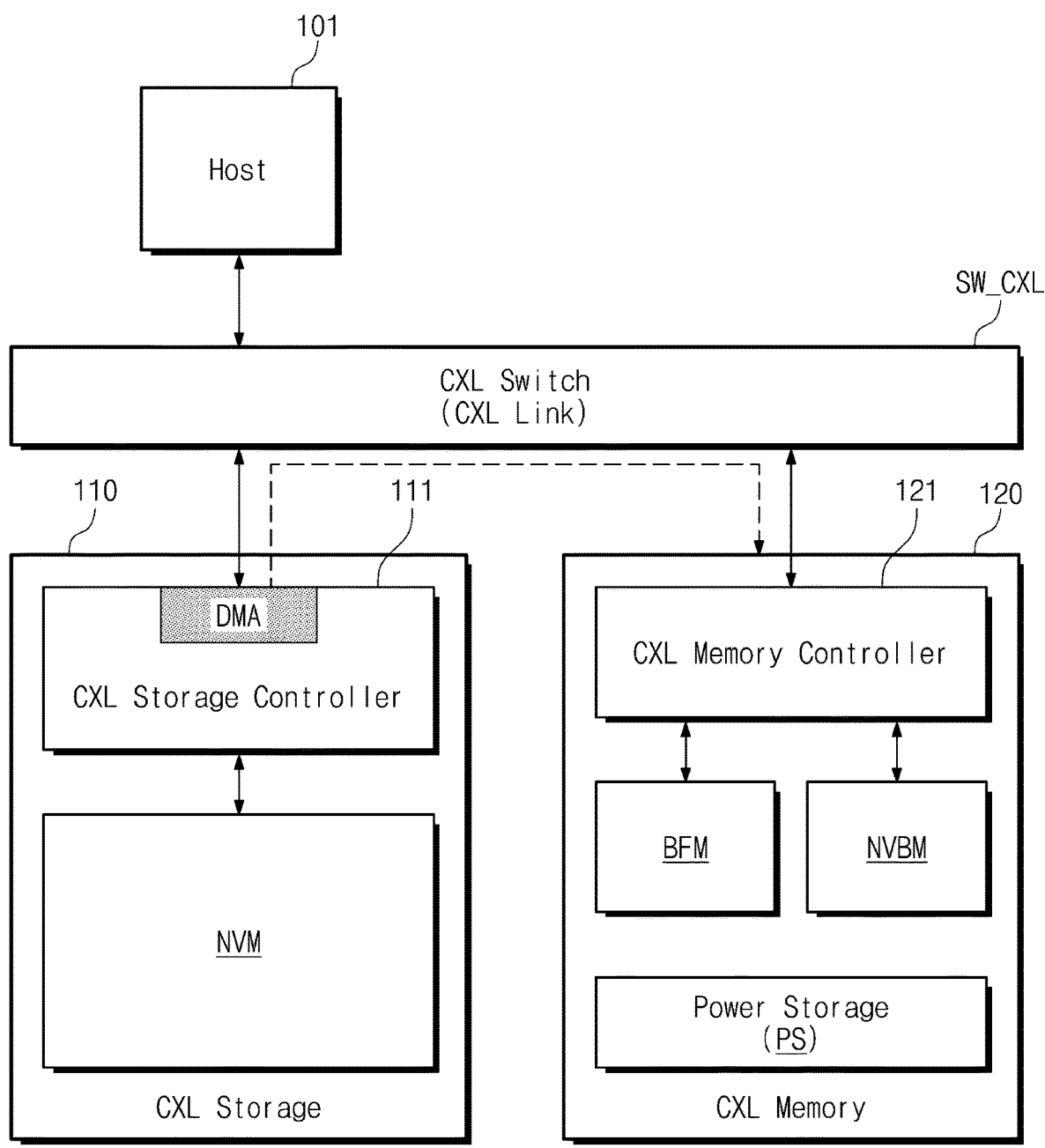
FIGS. 7 and 8 are diagrams for describing an operation in which map data are stored in a CXL memory, according to embodiments.
Figure 8:
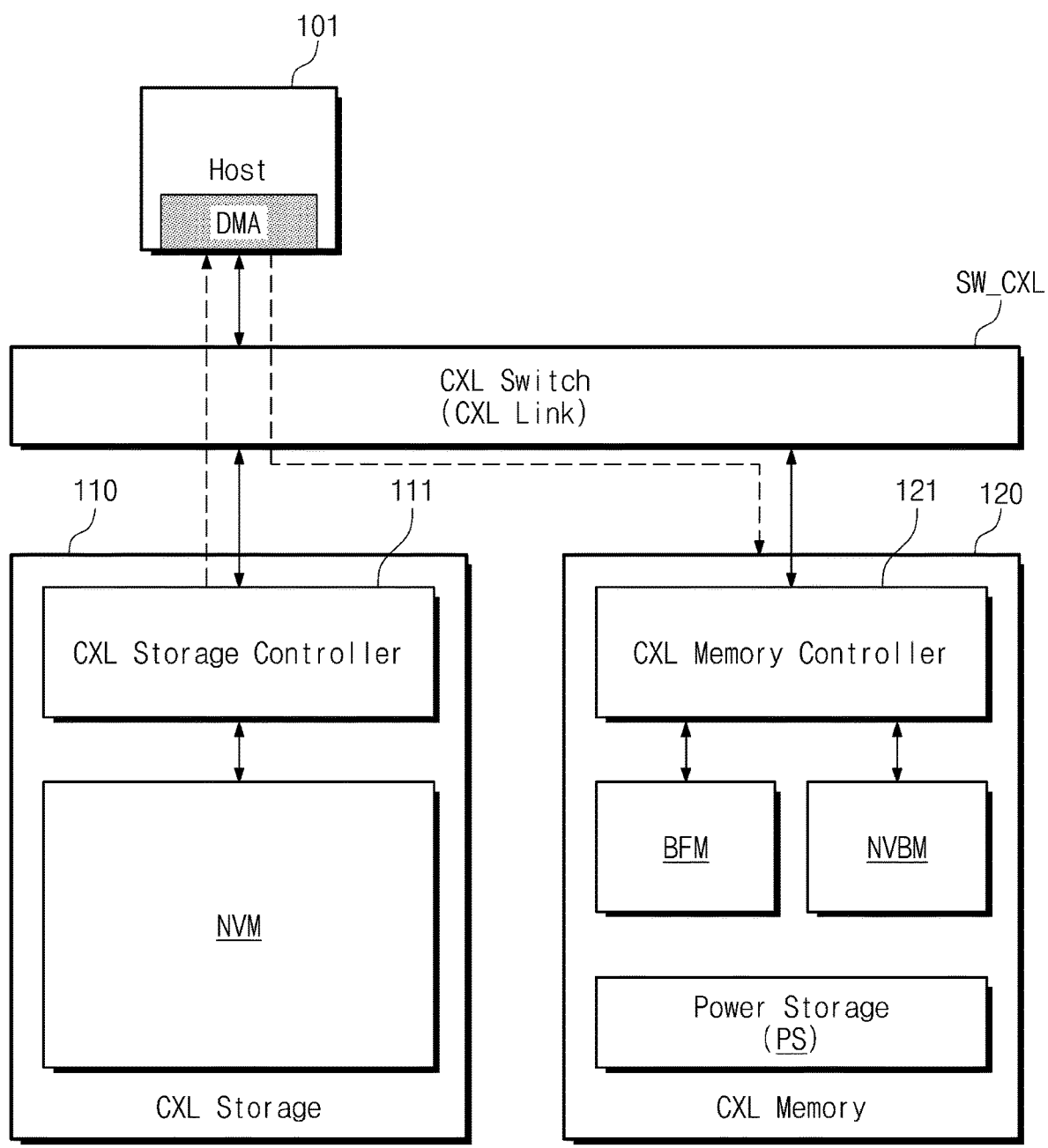

FIGS. 7 and 8 are diagrams for describing an operation in which map data are stored in a CXL memory, according to embodiments. In an embodiment, the map data MD present in the CXL storage 110 may be transferred and stored to the CXL memory 120 from the CXL storage 110 through various manners.

As an example, the CXL storage 110 and the CXL memory 120 may exchange the map data MD based on a peer-to-peer (P2P) manner. For example, as illustrated in FIG. 7, the CXL storage controller 111 of the CXL storage 110 may include a direct memory access (DMA) engine. The DMA engine included in the CXL storage controller 111 may transfer the map data MD present in the nonvolatile memory NVM to the CXL memory 120 without the interference or control of the host 101. That is, the map data MD may be transferred from the CXL storage 110 to the CXL memory 120 based on the P2P manner.

As an example, under control of the host 101, the CXL storage 110 and the CXL memory 120 may exchange the map data MD based on the DMA manner. For example, as illustrated in FIG. 8, the host 101 may include a direct memory access (DMA) engine. The DMA engine of the host 101 may read the map data MD from the CXL storage 110 and may transfer the map data MD thus read to the CXL memory 120. In an embodiment, the DMA engine of the host 101 may read the map data MD from the CXL storage 110 based on the CXL.io and may transfer the map data MD to the CXL memory 120 based on the CXL.mem.

The above manners in which map data are transferred from the CXL storage 110 to the CXL memory 120 are provided as an example, and embodiments are not limited thereto. It may be understood that the transfer of map data from the CXL storage 110 to the CXL memory 120 may be implemented in various manners using the CXL interface or the CXL switch. In an embodiment, the transfer (i.e., the backup or flush) of map data from the CXL memory 120 to the CXL storage 110 may also be implemented in a manner(s) similar to the above manners.

Figure 9:
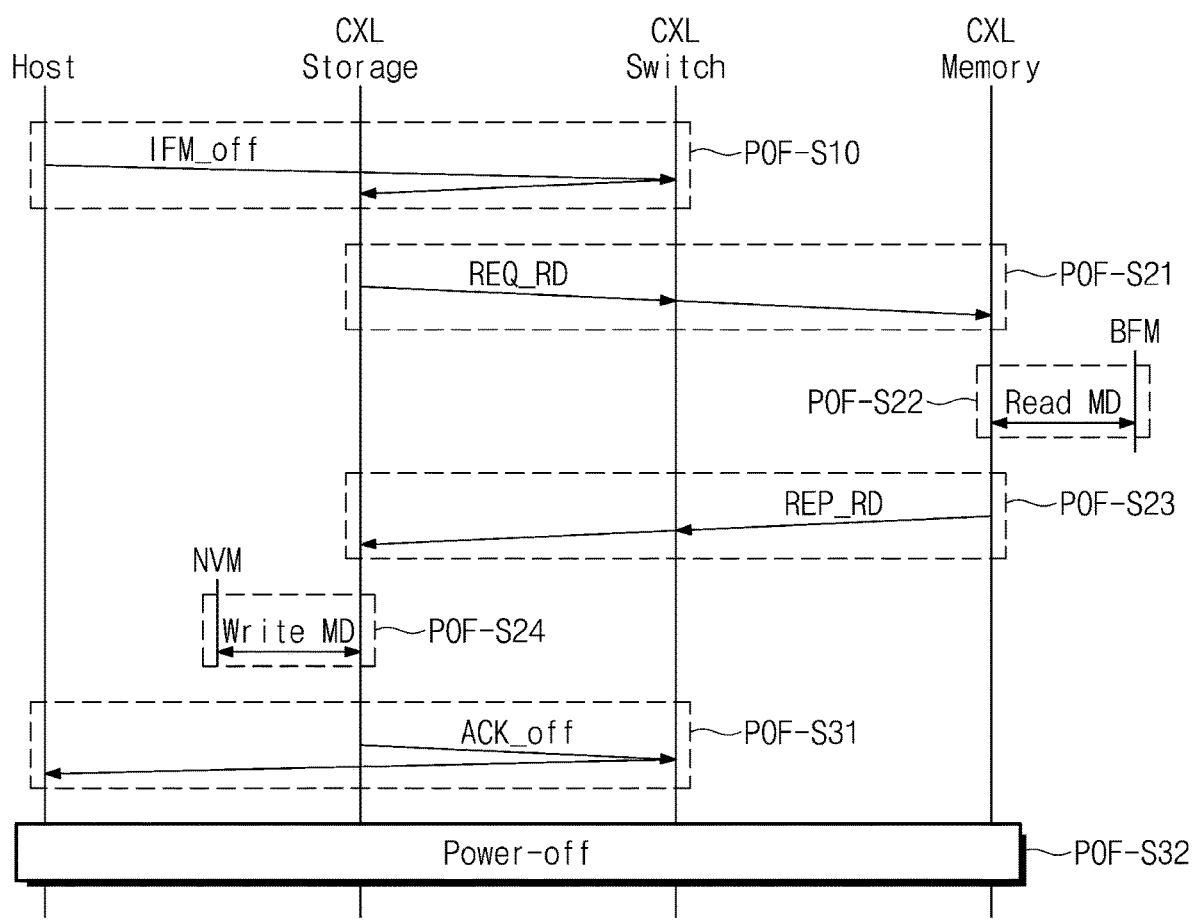
FIG. 9 is a flowchart illustrating a typical power-off operation of a computing system, according to an embodiment.

FIG. 9 is a flowchart illustrating a typical power-off operation of a computing system of FIG. 2. In an embodiment, a power-off operation of a computing system will be described with reference to FIG. 9, but embodiments are not limited thereto. For example, it may be understood that the operating method of FIG. 9 is applicable to the power-off operation or reset operation of each of various components (e.g., a host, CXL storage, a CXL memory, and a CXL switch) included in the computing system.

Referring to FIGS. 2 and 9, in operation POF-S10, the host 101 may output power-off information IFM_off through the CXL host interface circuit 101*a*. The CXL switch SW_CXL may transfer the power-off information IFM_off to the CXL storage 110. For example, the host 101 may recognize or detect information about power-off of the computing system 100. The host 101 may send the power-off information IFM_off to the CXL storage 110 through the CXL switch SW_CXL such that the CXL storage 110 performs the power-off operation.

In operation POF-S21, the CXL storage 110 may output a read request REQ_RD through the CXL storage interface circuit 111*a* in response to the power-off information IFM_off. The CXL switch SW_CXL may transfer the read request REQ_RD to the CXL memory 120. In an embodiment, the read request REQ_RD in operation POF-S21 may refer to a request for reading the entire map data MD stored in the CXL memory 120. The read request REQ_RD may include a memory address of an area where the map data MD are stored.

In operation POF-S22, the CXL memory 120 may read the map data MD in response to the read request REQ_RD. For example, the CXL memory 120 may read the map data MD from the buffer memory BFM based on the memory address included in the read request REQ_RD.

In operation POF-S23, the CXL memory 120 may output a read response REP_RD to the read request REQ_RD through the CXL memory interface circuit 121*a*. The CXL switch SW_CXL may transfer the read response REP_RD to the CXL storage 110.

In operation POF-S24, the CXL storage 110 may write the map data MD included in the read response REP_RD in the nonvolatile memory NVM. In an embodiment, the CXL storage 110 may store the map data MD of a given area of the nonvolatile memory NVM.

After the entire map data MD associated with the CXL storage 110 are stored in the nonvolatile memory NVM, in operation POF-S31, the CXL storage 110 may output a response ACK_off to the power-off information IFM_off. The CXL switch SW_CXL may send the response ACK_off to the host 101. The host 101 may recognize that the map data MD present in the CXL memory 120 are normally stored in the CXL storage 110, based on the response ACK_off.

Afterwards, in operation POF-S32, the host 101, the CXL storage 110, the CXL memory 120, and the CXL switch SW_CXL may be powered off. For example, a power that is provided to the host 101, the CXL storage 110, the CXL memory 120, and the CXL switch SW_CXL may be interrupted. That is, in the typical power-off, the CXL memory 120 may send the map data MD to the CXL storage 110 and may then leave alone the map data MD such that the loss of the map data MD in the CXL memory 120 is permitted.

The power-off operation described with reference to FIG. 9 is provided as an example, and embodiments are not limited thereto. For example, in some embodiments, after the CXL storage 110 stores the map data MD present in the CXL memory 120 in the nonvolatile memory NVM, the CXL storage 110 may provide a notification indicating that the map data MD are completely backed up, by sending the response ACK_off to the host 101 (i.e., an interrupt manner). Alternatively, the CXL storage 110 may set a value of a specific register to a given value after storing the map data MD present in the CXL memory 120 in the nonvolatile memory NVM. The host 101 may check whether the map data MD are completely backed up, by periodically checking the value of the specific register of the CXL storage 110 (a polling manner). Alternatively, the CXL storage 110 may be configured to complete a backup operation for the map data MD within a given time from a point in time when the power-off information IFM_off is received from the host 101 (a time-out manner). As described above, the CXL storage 110 may transfer information about backup completion of the map data MD to the host 101 through at least one of various manners.

Figure 10:
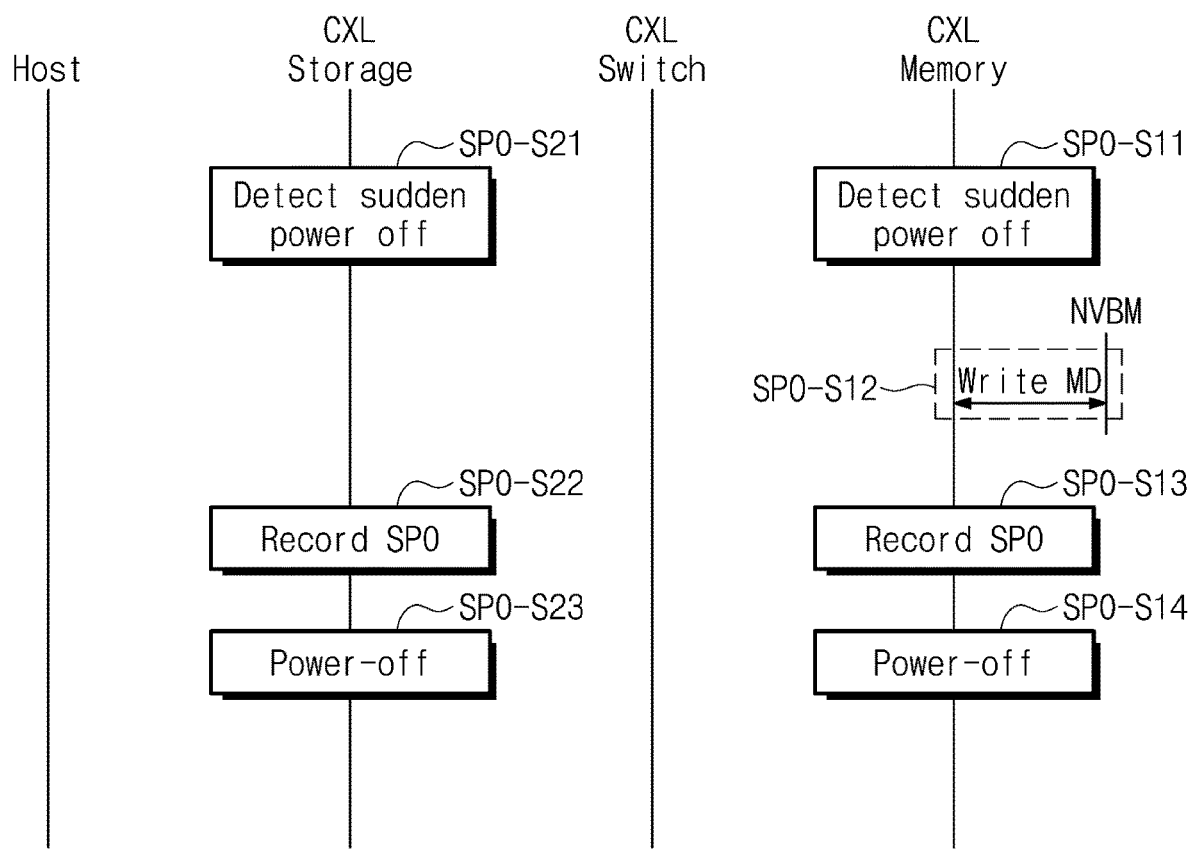
FIG. 10 is a flowchart illustrating a sudden power-off operation of a computing system, according to an embodiment.

FIG. 10 is a flowchart illustrating a sudden power-off (SPO) operation of a computing system of FIG. 2, according to an embodiment. In an embodiment, how a computing system copes with the sudden power-off (SPO) will be described with reference to FIG. 10, but embodiments are not limited thereto. For example, it may be understood that the operating method of FIG. 10 is applicable to the power-off operation or reset operation of each of various components (e.g., a host, CXL storage, a CXL memory, and a CXL switch) included in the computing system.

Referring to FIGS. 2 and 10, in operation SPO-S11, the CXL memory 120 may detect the sudden power-off (SPO) (or the sudden power-off (SPO) event). For example, in response to the power supply voltage decreasing or in response to a signal transferred through the CXL switch SW_CXL, the CXL memory 120 may detect the sudden power-off (SPO) event. As the sudden power-off (SPO) event occurs, the CXL memory 120 may be supplied with the power from the power storage PS.

In operation SPO-S12, the CXL memory 120 may write the map data MD present in the buffer memory BFM in the nonvolatile backup memory NVBM. As the map data MD are written in the nonvolatile backup memory NVBM, the CXL memory 120 may prevent the loss of the map data MD.

In operation SPO-S13, the CXL memory 120 may record information indicating the CXL storage 110 has been backed up due to the sudden power-off (SPO) event. For example, the recorded information may include the following information: a device identifier ID of the CXL storage 110 or the CXL memory 120 and addresses (or an address range) of the area of the buffer memory BFM provided to the CXL storage 110. For example, the CXL memory 120 may record the information of the CXL storage 110, in which the sudden power-off (SPO) event has occurred, in one of various storage elements such as a nonvolatile storage element, an electrical fuse, and a mask ROM. Afterwards, in operation SPO-S14, the power-off may be performed.

While the CXL memory 120 performs operation SPO-S11 to operation SPO-S14, in operation SPO-S21, the CXL storage 110 may detect the sudden power-off (SPO) event. For example, in response to the power supply voltage decreasing or in response to a signal transferred through the CXL switch SW_CXL, the CXL storage 110 may detect the sudden power-off (SPO) event. As an embodiment, the CXL storage 110 may also include power storage. As the sudden power-off (SPO) occurs, the CXL storage 110 may be supplied with the power from the power storage.

In operation SPO-S22, the CXL storage 110 may record information indicating that the sudden power-off (SPO) event has occurred. For example, the CXL storage 110 may record the information indicating that the sudden power-off (SPO) event has occurred, in one of various storage elements such as a nonvolatile storage element, an electrical fuse, and a mask ROM. For example, the information that the CXL storage 110 records may include the following information: a device identifier ID of the CXL storage 110 or the CXL memory 120 and addresses of the area of the buffer memory BFM provided to the CXL storage 110. For example, the CXL storage 110 may include the power storage and may perform recording based on the power stored in the power storage. Afterwards, in operation SPO-S23, the power-off may be performed.

Figure 11:
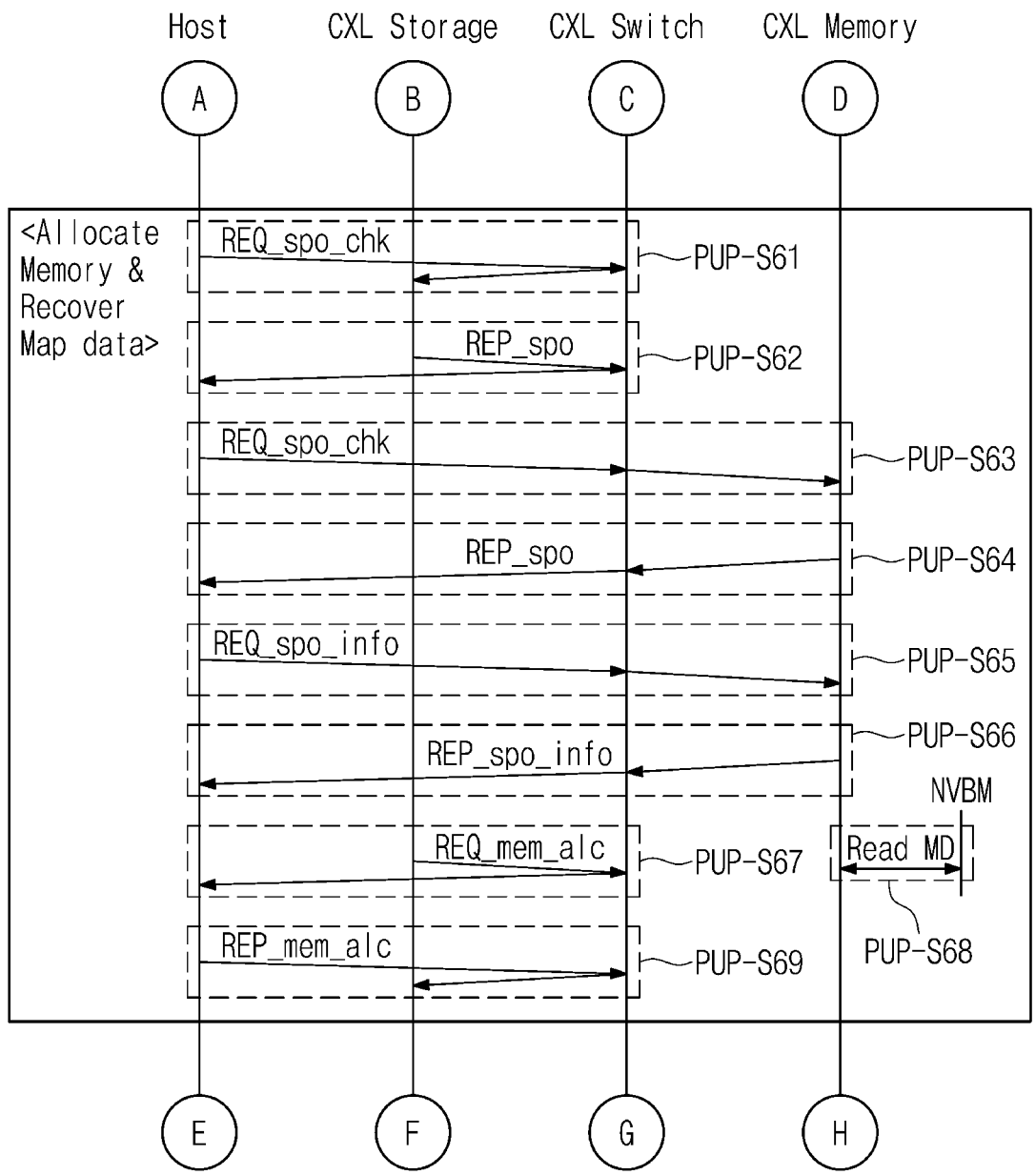
FIGS. 11 and 12 are flowcharts illustrating a second phase of initialization of a computing system performed when a sudden power-off event occurs, according to embodiments.
Figure 12:
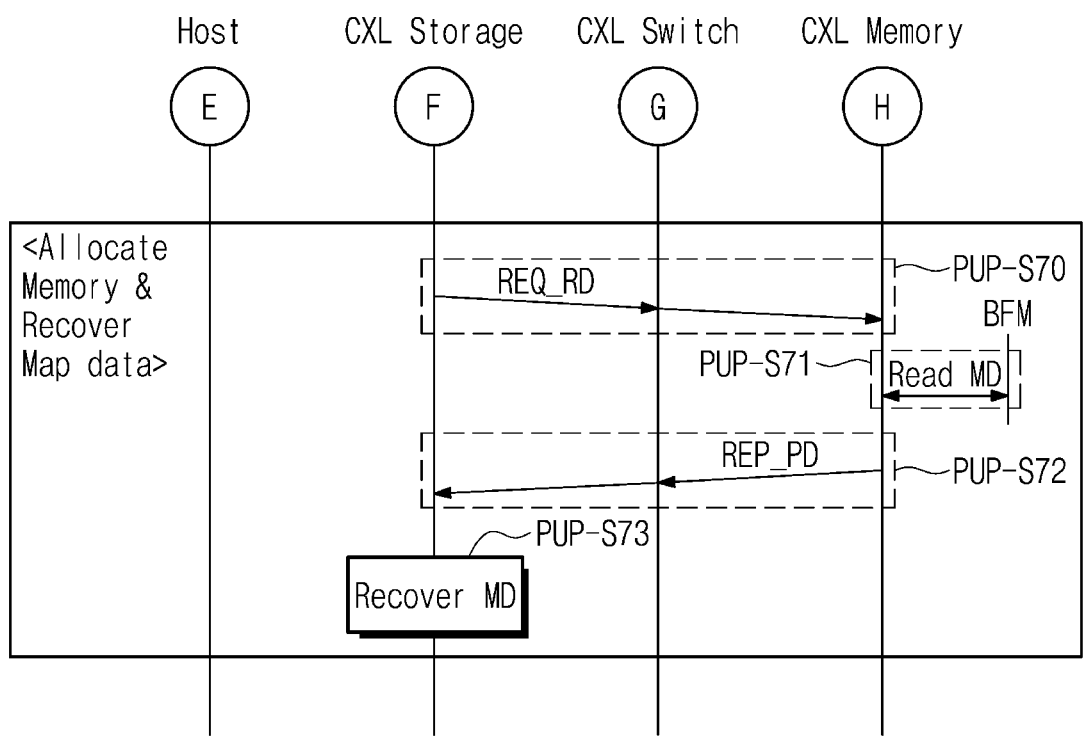

FIGS. 11 and 12 are flowcharts illustrating a second phase of initialization of a computing system performed when a sudden power-off (SPO) event has occurred. The reference signs A, B, C, and D of the flowchart in FIG. 4 may be respectively connected to the reference signs A, B, C, and D of the flowchart in FIG. 11. The reference signs E, F, G, and H of the flowchart in FIG. 11 may be respectively connected to reference signs E, F, G, and H of the flowchart in FIG. 12.

Referring to FIGS. 3, 4, 11, and 12, in operation PUP-S61, the host 101 may send, to the CXL storage 110, the request REQ_spo_chk for checking whether the sudden power-off (SPO) event has occurred. In operation PUP-S62, the CXL storage 110 may send, to the host 101, the response REP_spo providing notification that the sudden power-off (SPO) event has occurred. The host 101 may identify that the CXL storage 110 has experienced the sudden power-off (SPO), based on the response REP_spo.

In operation PUP-S63, the host 101 may send, to the CXL memory 120, the request REQ_spo_chk for checking whether the sudden power-off (SPO) event has occurred. In operation PUP-S64, the CXL memory 120 may send, to the host 101, the response REP_spo providing notification that the sudden power-off (SPO) event has occurred. The host 101 may identify that the CXL memory 120 has experienced the sudden power-off (SPO), based on the response REP_spo.

When the sudden power-off (SPO) event has occurred, as shown in FIG. 11, the recovery of the map data MD may be performed. In operation PUP-S65, the host 101 may send a request REQ_spo_info for information about the backed-up map data MD to the CXL memory 120. In operation PUP-S66, the CXL memory 120 may send, to the host 101, a response REP_spo_info including information about the map data MD backed up to the nonvolatile backup memory NVBM. The information about the map data MD includes the following: an identifier ID of the CXL storage 110 associated with the map data MD and addresses (or an address range) of an area of the buffer memory BFM, in which the map data MD are stored.

While or after the host 101 obtains the information about the map data MD requiring recovery, in operation PUP-S67, the CXL storage 110 may output the memory allocation request REQ_mem_alc through the CXL storage interface circuit 111a. The memory allocation request REQ_mem_alc may be transferred to the CXL switch SW_CXL. The CXL switch SW_CXL may transfer the memory allocation request REQ_mem_alc to the host 101.

While or after the host 101 obtains the information about the map data MD requiring recovery, in operation PUP-S68, the CXL memory 120 may read the map data MD from the nonvolatile backup memory NVBM and may store the map data MD in the buffer memory BFM. The CXL memory 120 may store the map data MD in the area of the buffer memory BFM, which corresponds to the addresses (or address range) included in the response REP_spo_info.

In operation PUP-S69, the host 101 may output a memory allocation response REP_mem_alc through the CXL host interface circuit 101a. The memory allocation response REP_mem_alc may be transferred to the CXL switch SW_CXL. The CXL switch SW_CXL may transfer the memory allocation response REP_mem_alc to the CXL storage 110 targeted for the memory allocation response REP_mem_alc. In an embodiment, the memory allocation response REP_mem_alc may include the following: a device identifier of the CXL memory 120 and addresses (e.g., a logical address range or a virtual address range) of an area of the buffer memory BFM in the CXL memory 120, in which the recovered map data MD are stored.

In operation PUP-S70, the CXL storage 110 may send the request REQ_RD for reading the recovered map data MD to the CXL memory 120 through the CXL switch SW_CXL. In operation PUP-S71, the CXL memory 120 may read the map data MD from the buffer memory BFM. In operation PUP-S72, the CXL memory 120 may send the map data MD read from the buffer memory BFM to the CXL storage 110 through the CXL switch SW_CXL.

In operation PUP-S73, the CXL storage 110 may recover the map data MD present in the nonvolatile memory NVM based on the transferred map data MD, so as to be up-to-date. Afterwards, the CXL storage 110 may perform address mapping by using the map data MD stored in the buffer memory BFM of the CXL memory 120. Afterwards, the host 101, the CXL storage 110, and the CXL memory 120 may perform a normal operation (e.g., a read operation or a write operation) based on the recovered map data MD.

Alternatively, the CXL storage 110 may again perform operation PUP-S45 to operation PUP-S51 of FIG. 5 such that a new storage space of the buffer memory BFM of the CXL memory 120 is allocated and the map data MD of the nonvolatile memory NVM are again loaded onto the new storage space allocated from the buffer memory BFM of the CXL memory 120. Afterwards, the CXL storage 110 may perform address mapping by using the map data MD loaded onto the buffer memory BFM of the CXL memory 120. Afterwards, the host 101, the CXL storage 110, and the CXL memory 120 may perform a normal operation (e.g., a read operation or a write operation).

Figure 13:
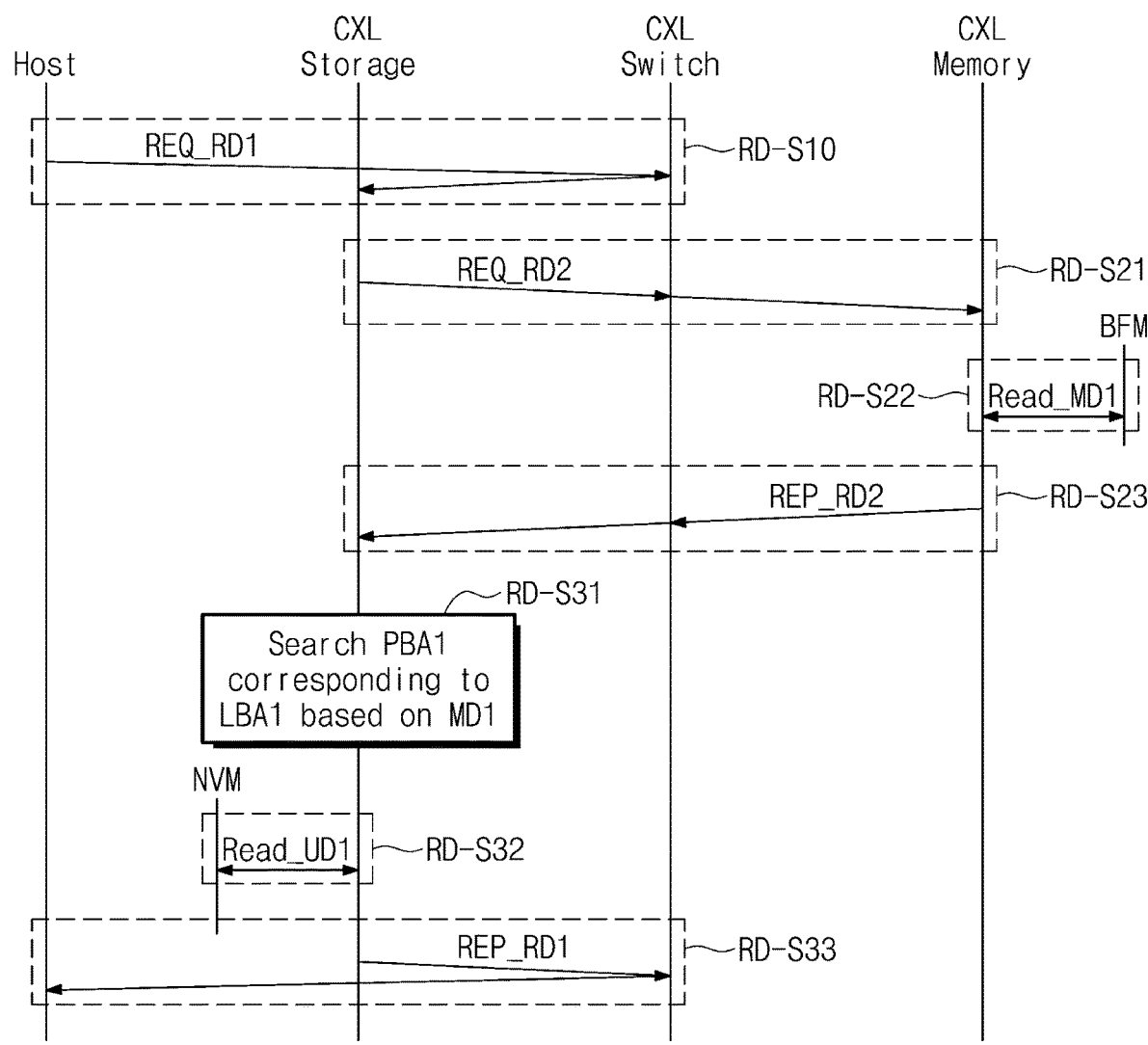
FIG. 13 is a flowchart illustrating a read operation for CXL storage, according to an embodiment.

FIG. 13 is a flowchart illustrating a read operation for CXL storage of FIG. 2. In an embodiment, the read operation for the CXL storage 110 according to the flowchart of FIG. 13 may be performed after the initialization operation of FIGS. 4 and 5 or FIGS. 4, 11, and 12 is performed (i.e., after the map data MD of the CXL storage 110 are stored in the dedicated area of the CXL memory 120).

Referring to FIGS. 2, 3, and 13, in operation RD-S10, the host 101 may output a first read request REQ_RD1 through the CXL host interface circuit 101a. The CXL switch SW_CXL may transfer the first read request REQ_RD1 to the CXL storage 110 targeted for the first read request REQ_RD1. In an embodiment, the first read request REQ_RD1 may refer to a request for reading first user data UD1 stored in the CXL storage 110 and may include a first logical block address LBA1 corresponding to the first user data UD1.

In operation RD-S21, the CXL storage 110 may output a second read request REQ_RD2 through the CXL storage interface circuit 111a in response to the first read request REQ_RD1. The CXL switch SW_CXL may transfer the second read request REQ_RD2 to the CXL memory 120. In an embodiment, the second read request REQ_RD2 may refer to a request for reading first map data MD1 (e.g., a necessary address pair) corresponding to the first logical block address LBA1. That is, the second read request REQ_RD2 may refer to a request for reading the first map data MD1 from the CXL memory 120. The second read request REQ_RD2 may include information about a memory address (e.g., a logical address or a virtual address) of the CXL memory 120, which indicates an area where the first map data MD1 are stored.

In operation RD-S22, the CXL memory 120 may read the first map data MD1 in response to the second read request REQ_RD2. For example, the CXL memory controller 121 of the CXL memory 120 may read the first map data MD1 from the area corresponding to the memory address (e.g., a logical address or a virtual address) included in the second read request REQ_RD2. In an embodiment, the CXL memory controller 121 may read the first map data MD1 from the buffer memory BFM by using the buffer memory interface circuit 121d.

In an embodiment, the first map data MD1 read in operation RD-S22 may be a portion of the entire map data MD and may be map data corresponding to the first logical block address LBA1. That is, the first map data MD1 may include information about a first physical block address PBA1 corresponding to the first logical block address LBA1.

In operation RD-S23, the CXL memory 120 may output a second read response REP_RD2 including the first map data MD1 through the CXL memory interface circuit 121a. The CXL switch SW_CXL may transfer the second read response REP_RD2 to the CXL storage 110. In an embodiment, the first map data MD1 included in the second read response REP_RD2 received through the CXL switch SW_CXL may be stored or temporarily stored in the RAM 111c of the CXL storage controller 111.

In an embodiment, when the first map data MD1 corresponding to the first logical block address LBA1 is already present in the RAM 111c of the CXL storage controller 111, operation RD-S21 to operation RD-S23 (i.e., operations for loading the first map data MD1 from the CXL memory 120) may be omitted.

In operation RD-S31, the CXL storage 110 may search for the first physical block address PBA1 corresponding the first logical block address LBA1 based on the first map data MD1. For example, the FTL 111d of the CXL storage controller 111 may search for the first physical block address PBA1 corresponding to the first logical block address LBA1 based on the first map data MD1.

In operation RD-S32, the CXL storage 110 may read the first user data UD1 present in an area corresponding to the first physical block address PBA1 from the nonvolatile memory NVM. For example, the CXL storage controller 111 may read the first user data UD1 from the area of the nonvolatile memory NVM, which corresponds to the first physical block address PBA1. In an embodiment, the CXL storage controller 111 may read the first user data UD1 from the nonvolatile memory NVM by using the NAND interface circuit 111f.

In operation RD-S33, the CXL storage 110 may output a first read response REP_RD1 to the first read request REQ_RD1 through the CXL storage interface circuit 111a. The CXL switch SW_CXL may transfer the first read response REP_RD1 to the host 101. In an embodiment, the first read response REP_RD1 may include the first user data UD1 requested through the first read request REQ_RD1. The host 101 may obtain the first user data UD1 through the first read response REP_RD1.

In an embodiment, operation RD-S10 and operation RD-S33 corresponding to the communications between the host 101 and the CXL storage 110 may be performed based on the CXL.io, and operation RD-S21 to operation RD-S23 corresponding to the communications between the CXL storage 110 and the CXL memory 120 may be performed based on the CXL.mem. However, embodiments are not limited thereto. For example, the communications between the host 101, the CXL storage 110, and the CXL memory 120 may be performed through the CXL switch SW_CXL (i.e., a common interface, a common link, or a common switch).

Figure 14:
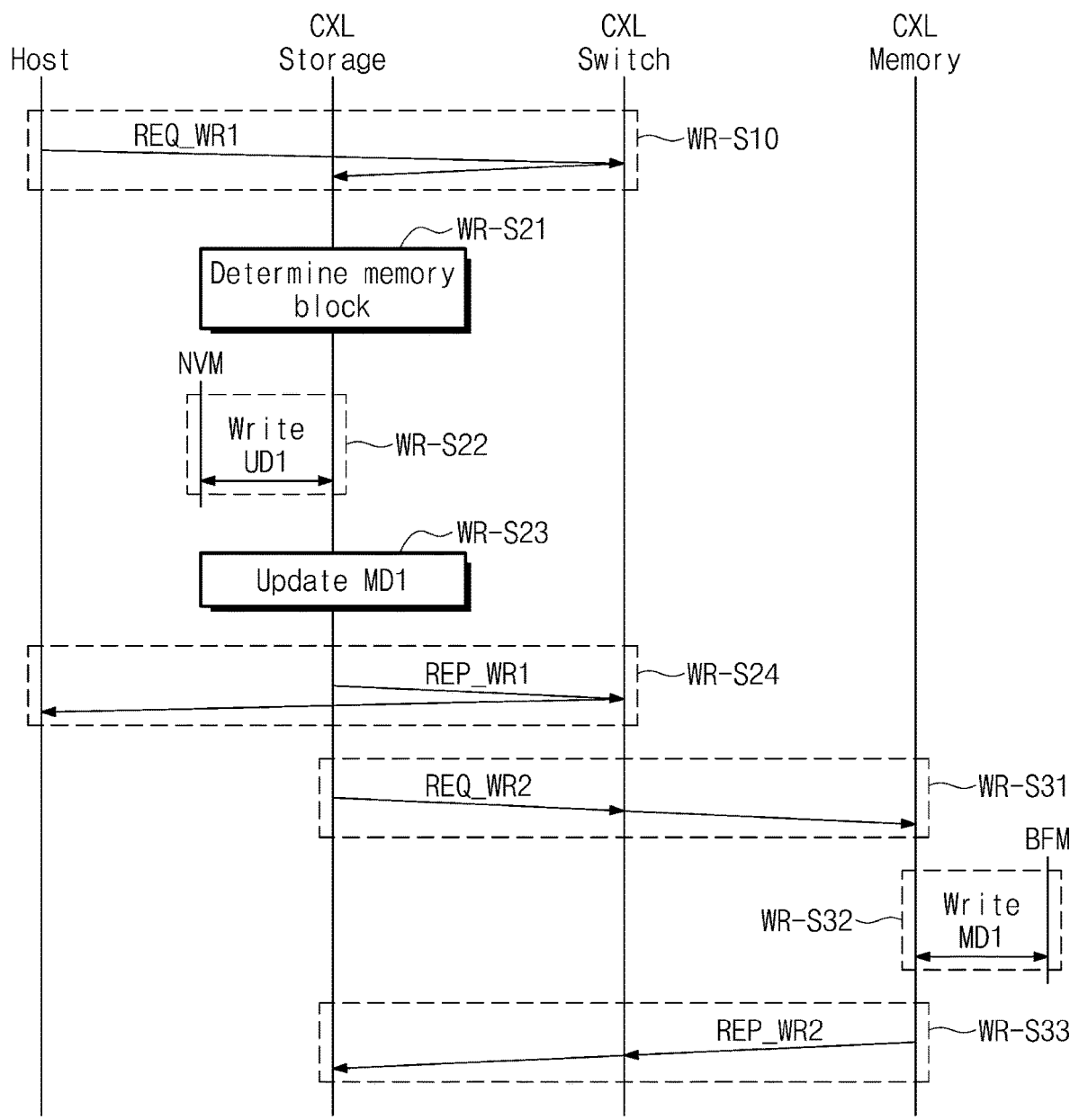
FIG. 14 is a flowchart illustrating a write operation for CXL storage, according to an embodiment.

FIG. 14 is a flowchart illustrating a write operation for CXL storage of FIG. 2. In an embodiment, the write operation for the CXL storage 110 according to the flowchart of FIG. 14 may be performed after the initialization operation of FIGS. 4 and 5 or FIGS. 4, 11, and 12 is performed (i.e., after the map data MD of the CXL storage 110 are stored in the dedicated area of the CXL memory 120).

Referring to FIGS. 2, 3, and 14, in operation WR-S10, the host 101 may output a first write request REQ_WR1 through the CXL host interface circuit 101a. The CXL switch SW_CXL may transfer the first write request REQ_WR1 to the CXL storage 110. In an embodiment, the first write request REQ_WR1 may refer to a request for writing the first user data UD1 in the CXL storage 110.

In operation WR-S21, the CXL storage 110 may determine a memory block in which the first user data UD1 are to be written, in response to the first write request REQ_WR1. For example, the FTL 111d of the CXL storage controller 111 may manage block information about a memory block, which is free, capable of being written to, or capable of being allocated, from among memory blocks included in the nonvolatile memory NVM. The FTL 111d may select a memory block, in which the first user data UD1 are to be written, based on the block information.

In operation WR-S22, the CXL storage 110 may write the first user data UD1 in the selected memory block. For example, the CXL storage controller 111 may control the nonvolatile memory NVM such that the first user data UD1 are written in the selected memory block. In an embodiment, the CXL storage controller 111 may write the first user data UD1 in the nonvolatile memory NVM by using the NAND interface circuit 111f.

When the first user data UD1 are completely written in the nonvolatile memory NVM (i.e., when a program operation for the nonvolatile memory NVM is completed), in operation WR-S23, the CXL storage 110 may update the first map data MD1 or may generate the first map data MD1. For example, the first map data MD1 may include information indicating that the first user data UD1 corresponding to the first logical block address LBA1 are stored in an area of the nonvolatile memory NVM, which corresponds to the first physical block address PBA1. That is, the CXL storage 110 may generate the first map data MD1 indicating that the first user data UD1 corresponding to the first logical block address LBA1 are stored in the area corresponding to the first physical block address PBA1.

In operation WR-S24, the CXL storage 110 may output a first write response REP_WR1 to the first write request REQ_WR1 through the CXL storage interface circuit 111a. The CXL switch SW_CXL may transfer the first write response REP_WR1 to the host 101. In response to the first write response REP_WR1, the host 101 may determine that the first user data UD1 corresponding to the first write request REQ_WR1 are normally stored in the CXL storage 110.

After the write operation for the CXL storage 110 requested by the host 101 is completed, the CXL storage 110 may perform a map data update operation. For example, in operation WR-S31, the CXL storage 110 may output a second write request REQ_WR2 through the CXL storage interface circuit 111a. The CXL switch SW_CXL may transfer the second write request REQ_WR2 to the CXL memory 120.

In an embodiment, the second write request REQ_WR2 may refer to a request for writing the first map data MD1, which are updated or generated as the first user data UD1 are stored, in the CXL memory 120. The second write request REQ_WR2 may include a memory address at which the first map data MD1 are to be stored. The memory address included in the second write request REQ_WR2 may indicate the area of the CXL memory 120, which is dedicated for the CXL storage 110.

In operation WR-S32, the CXL memory 120 may store the first map data MD1 in the corresponding area in response to the second write request REQ_WR2. For example, the CXL memory 120 may write the first map data MD1 in the area corresponding to the memory address included in the second write request REQ_WR2.

In operation WR-S33, the CXL memory 120 may output a second write response REP_WR2 to the second write request REQ_WR2 through the CXL memory interface circuit 121a. The CXL switch SW_CXL may transfer the second write response REP_WR2 to the CXL storage 110.

In an embodiment, operation WR-S31 to operation WR-S33 (i.e., an operation of storing map data in the CXL memory 120 or an operation of updating map data) may be performed whenever the write operation for the CXL storage 110 is completed. Alternatively, operation WR-S31 to operation WR-S33 may be performed when the size of map data updated or newly generated reaches a given value. Alternatively, operation WR-S31 to operation WR-S33 may be performed periodically. However, embodiments are not limited thereto. For example, map data that are generated or updated during the operation of the CXL storage 110 may be stored in the CXL memory 120 according to various operation policies.

Figure 15:
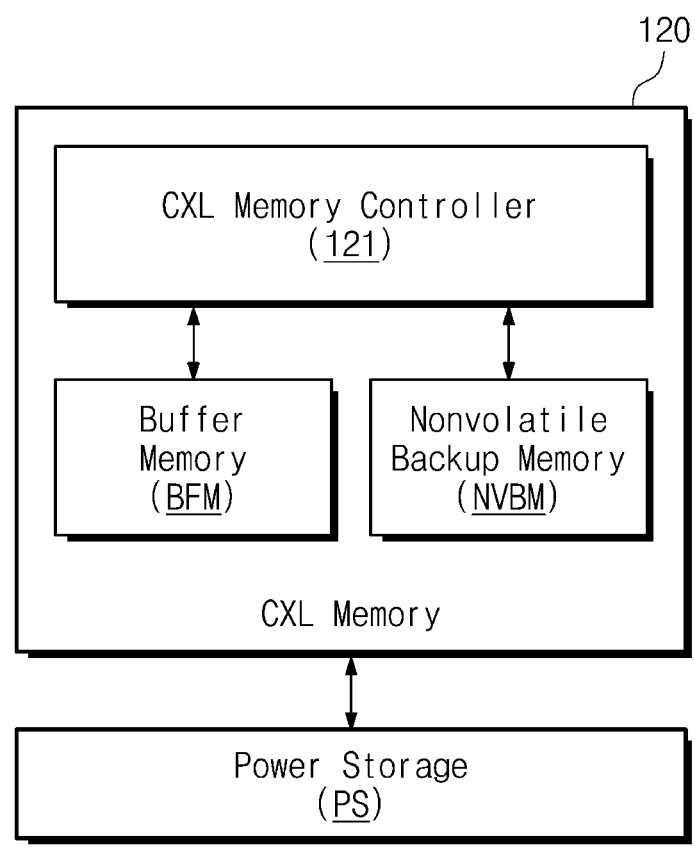
FIG. 15 illustrates a CXL memory, according to an embodiment.

FIG. 15 illustrates another example where the CXL memory 120 is implemented, according to an embodiment. Referring to FIG. 15, the CXL memory 120 may not include the power storage PS. The power storage PS may be placed outside the CXL memory 120 and may be connected with the CXL memory 120. For example, the power storage PS may include a module that is detachably coupled to the CXL memory 120.

Figure 16:
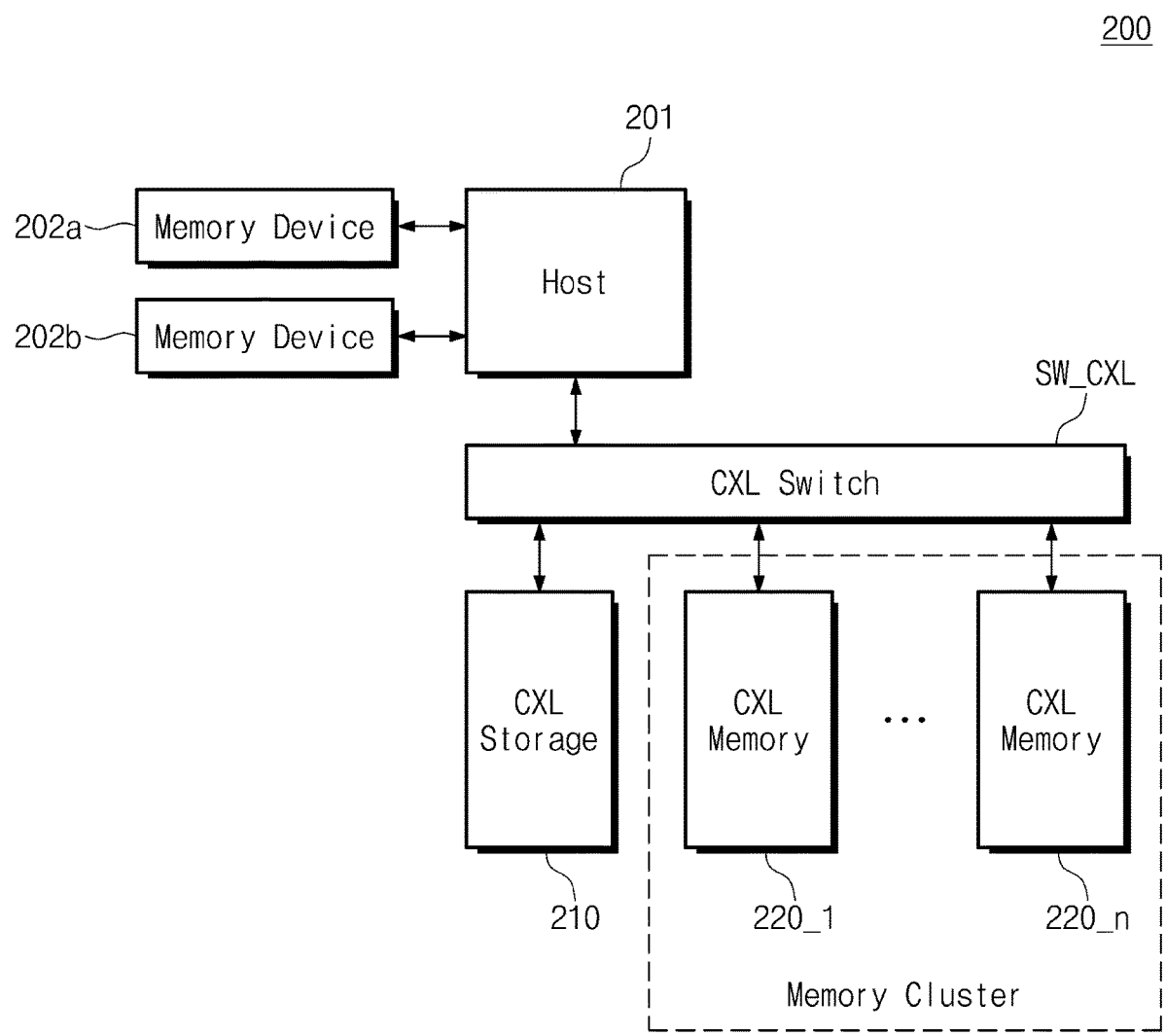
FIG. 16 is a block diagram illustrating a computing system according to an embodiment.

FIG. 16 is a block diagram illustrating a computing system according to an embodiment. Below, for convenience of description, additional description associated with the components described above will be omitted to avoid redundancy. Referring to FIG. 16, a computing system 200 may include a host 201, a plurality of memory devices 202a and 202b, the CXL switch SW_CXL, CXL storage 210, and a plurality of CXL memories 220_1 to 220_n.

The host 201 may be directly connected with the plurality of memory devices 202a and 202b. The host 201, the CXL storage 210, and the plurality of CXL memories 220_1 to 220_n may be connected with the CXL switch SW_CXL and may communicate with each other through the CXL switch SW_CXL.

In an embodiment, the CXL storage 210 may have a structure similar to that of the CXL storage 110 described with reference to FIGS. 2 to 15, and each of the plurality of CXL memories 220_1 to 220_n may have a structure similar to that of the CXL memory 120 described with reference to FIGS. 2 to 15. That is, each of the plurality of CXL memories 220_1 to 220_n may be implemented with an individual memory device or memory module and may be connected with the CXL switch SW_CXL through different physical ports. As the plurality of CXL memories 220_1 to 220_n are connected with the CXL switch SW_CXL, a memory area (or capacity) that is managed by the host 201 may increase.

In an embodiment, the host 201 may manage the plurality of CXL memories 220_1 to 220_n as one memory cluster. In an embodiment, the host 201 may allocate at least some of the plurality of CXL memories 220_1 to 220_n for a memory dedicated for the CXL storage 210. Alternatively, the host 201 may allocate at least a partial area of each of the plurality of CXL memories 220_1 to 220_n for a memory dedicated for the CXL storage 210.

In the sudden power-off (or when the sudden power-off event occurs), at least one CXL memory that stores the map data MD of the CXL storage 210 may back up the map data MD to the nonvolatile backup memory NVBM of the CXL memory. The CXL memory that backs up the map data MD may record information indicating that the sudden power-off event has occurred and may also record a device identifier of the CXL storage 210 corresponding to the map data MD and addresses (or an address range) of the buffer memory BFM, at which the map data MD have been stored. A CXL memory that does not back up the map data MD may record information indicating that the sudden power-off event has occurred, but may not record a device identifier. Alternatively, a CXL memory that does not back up the map data MD may not record information indicating that the sudden power-off event has occurred.

When powered up, the host 201 may perform the check of the sudden power-off (SPO) in operation PUP-S63 and operation PUP-S64 of FIG. 11, for each of the plurality of CXL memories 220_1 to 220_n. The host 201 may identify that the sudden power-off (SPO) event has occurred, and may recover the map data MD of the CXL storage 210 by performing the operations of FIGS. 11 and 12 with the CXL memory that records the device identifier.

In an embodiment, as described with reference to FIGS. 2 to 14, at least one of the plurality of CXL memories 220_1 to 220_n may include the power storage PS. As described with reference to FIG. 15, at least one of the plurality of CXL memories 220_1 to 220_n may include the power storage PS placed outside. Two or more CXL memories that do not include the power storage PS may be connected in common with the one power storage PS so as to be supplied with the power.

Figure 17:
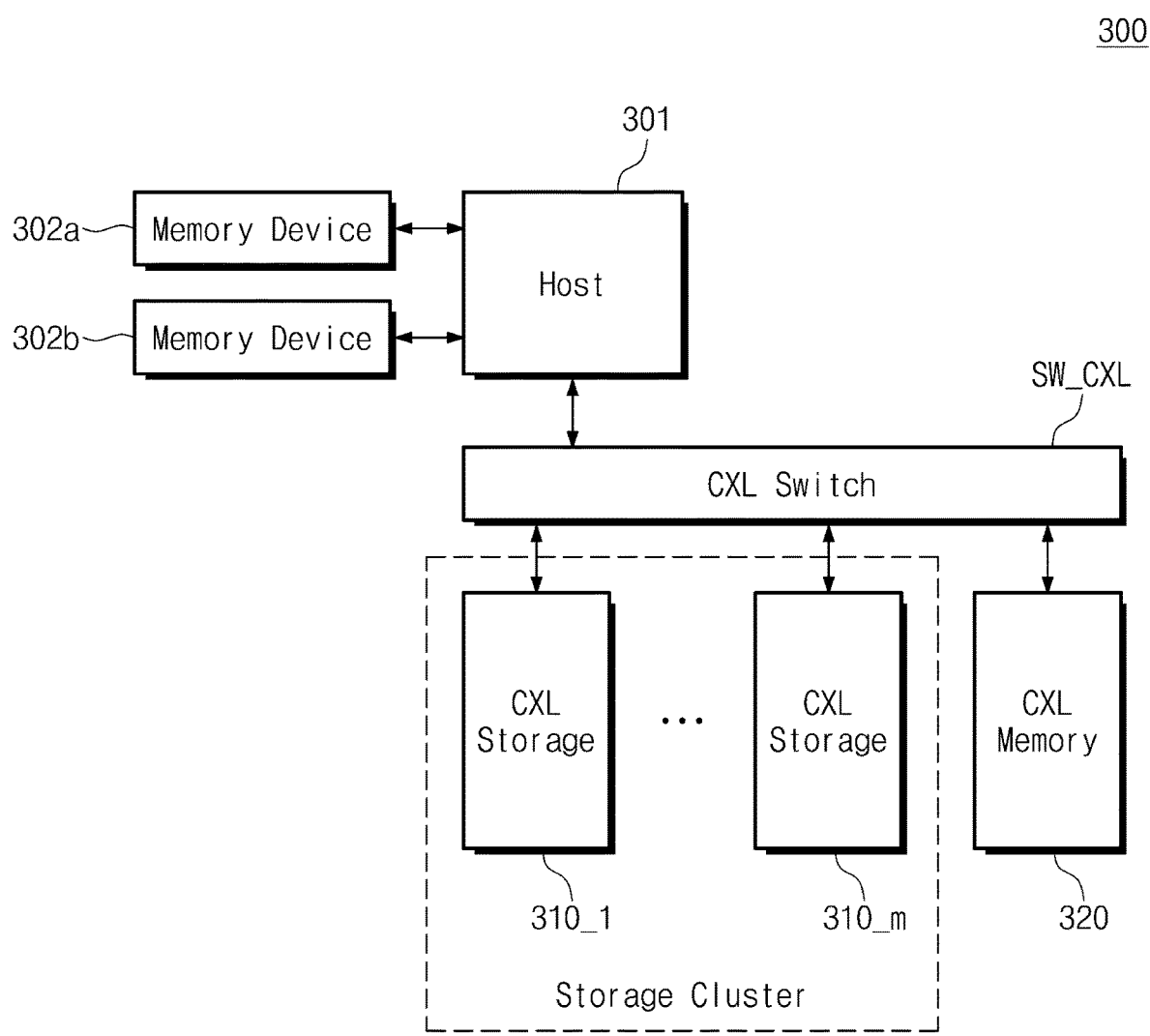
FIG. 17 is a block diagram illustrating a computing system according to an embodiment.

FIG. 17 is a block diagram illustrating a computing system according to an embodiment. Below, for convenience of description, additional description associated with the components described above will be omitted to avoid redundancy. Referring to FIG. 17, a computing system 300 may include a host 301, a plurality of memory devices 302a and 302b, the CXL switch SW_CXL, a plurality of CXL storages 310_1 to 310_m, and a CXL memory 320.

The host 301 may be directly connected with the plurality of memory devices 302a and 302b. The host 301, the plurality of CXL storages 310_1 to 310_m, and the CXL memory 320 may be connected with the CXL switch SW_CXL and may communicate with each other through the CXL switch SW_CXL.

In an embodiment, each of the plurality of CXL storages 310_1 to 310_m may have a structure similar to that of the CXL storage 110 described with reference to FIGS. 2 to 15, and the CXL memory 320 may have a structure similar to that of the CXL memory 120 described with reference to FIGS. 2 to 15. That is, each of the plurality of CXL storages 310_1 to 310_m may be implemented with an individual storage device or storage module and may be connected with the CXL switch SW_CXL through different physical ports. As the plurality of CXL storages 310_1 to 310_m are connected with the CXL switch SW_CXL, a storage area (or capacity) that is available by the host 201 may increase.

In an embodiment, at least a partial area of the CXL memory 320 may be allocated for an area dedicated for the plurality of CXL storages 310_1 to 310_m. For example, the host 301 may manage the plurality of CXL storages 310_1 to 310_m as one storage cluster and may allocate a partial area of the CXL memory 320 for a dedicated area of one storage cluster. Alternatively, the host 301 may allocate partial areas of the CXL memory 320 for dedicated areas of the respective CXL storages 310_1 to 310_m.

In the sudden power-off (or when the sudden power-off event occurs), the CXL memory 320 may back up the map data MD of each of the plurality of CXL storages 310_1 to 310_m to a nonvolatile backup memory NVBM provided in the CXL memory 320. The CXL memory 320 may record information indicating that the sudden power-off event has occurred, and may record addresses (or an address range) of the buffer memory BFM, at which the map data MD of each of the plurality of CXL storages 310_1 to 310_m have been stored, so as to be associated with a device identifier of each of the plurality of CXL storages 310_1 to 310_m.

When powered up, the host 101 may perform the check of the sudden power-off (SPO) in operation PUP-S61 and operation PUP-S62 of FIG. 11, for each of the plurality of CXL storages 310_1 to 310_m. When it is identified that the sudden-power off event has occurred in one of the plurality of CXL storages 310_1 to 310_m, the host 101 may perform the operations of FIGS. 11 and 12 based on the device identifier of each of the plurality of CXL storages 310_1 to 310_m such that the map data MD of each of the plurality of CXL storages 310_1 to 310_m are recovered from the CXL memory 320.

In an embodiment, as described with reference to FIGS. 2 to 14, the CXL memory 320 may include the power storage PS. As described with reference to FIG. 15, the CXL memory 320 may be connected with external power storage PS and may be supplied with the power therefrom.

Figure 18:
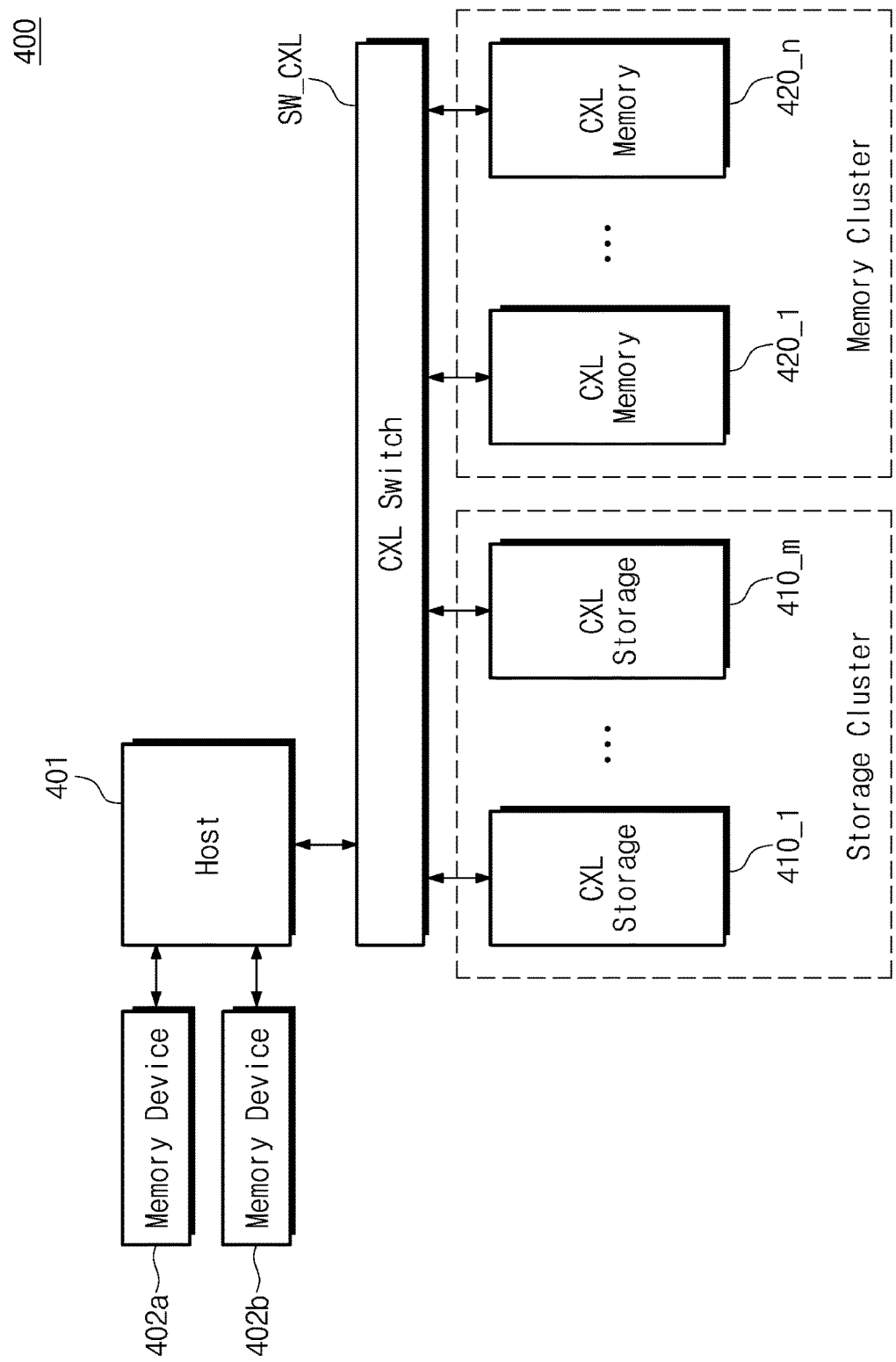
FIG. 18 is a block diagram illustrating a computing system according to an embodiment.

FIG. 18 is a block diagram illustrating a computing system according to an embodiment. Below, for convenience of description, additional description associated with the components described above will be omitted to avoid redundancy. Referring to FIG. 18, a computing system 400 may include a host 401, a plurality of memory devices 402a and 402b, the CXL switch SW_CXL, a plurality of CXL storages 410_1 to 410_m, and a plurality of CXL memories 420_1 to 420_n.

The host 401 may be directly connected with the plurality of memory devices 402a and 402b. The host 401, the plurality of CXL storages 410_1 to 410_m, and the plurality of CXL memories 420_1 to 420_n may be connected with the CXL switch SW_CXL and may communicate with each other through the CXL switch SW_CXL.

In an embodiment, the host 401 may manage the plurality of CXL storages 410_1 to 410_m as one storage cluster, and may mange the plurality of CXL memories 420_1 to 420_n as one memory cluster. The host 401 may allocate a partial area of the memory cluster for a dedicated area (i.e., an area for storing map data of the storage cluster) of the storage cluster. Alternatively, the host 401 may allocate areas of the CXL memories 420_1 to 420_n for dedicated areas of the respective CXL storages 410_1 to 410_m.

In the sudden power-off (or when the sudden power-off event occurs), at least one CXL memory that stores the map data MD of at least one CXL storage may back up the map data MD to the nonvolatile backup memory NVBM provided in the at least one CXL memory. The CXL memory that backs up the map data MD may record information indicating that the sudden power-off event has occurred, and may record addresses (or an address range(s)) of the buffer memory BFM, at which the map data MD have been stored, so as to be associated with a device identifier of CXL storage(s) corresponding to the map data MD. A CXL memory that does not back up the map data MD may record information indicating that the sudden power-off event has occurred but may not record a device identifier. Alternatively, a CXL memory that does not back up the map data MD may not record information indicating that the sudden power-off event has occurred.

When powered up, the host 401 may perform the check of the sudden power-off (SPO) in operation PUP-S61 and operation PUP-S62 of FIG. 11, for each of the plurality of CXL storages 410_1 to 410_m. When it is identified that the sudden-power off event has occurred in one of the plurality of CXL storages 410_1 to 410_m, the host 401 may identify the CXL memory (or memories) storing the map data MD of each of the plurality of CXL storages 410_1 to 410_m, based on the device identifier of each of the plurality of CXL storages 410_1 to 410_m. The host 401 may perform the operations of FIGS. 11 and 12 with respect to the CXL memory (or memories) storing the map data corresponding to each of the plurality of CXL storages 410_1 to 410_m such that the map data MD of each of the plurality of CXL storages 410_1 to 410_m are recovered from the plurality of CXL memories 420_1 to 420_n.

In an embodiment, as described with reference to FIGS. 2 to 14, at least one of the plurality of CXL memories 420_1 to 420_n may include the power storage PS. As described with reference to FIG. 15, at least one of the plurality of CXL memories 420_1 to 420_n may include the power storage PS placed outside. In an embodiment, two or more CXL memories may be connected in common with one power storage PS so as to be supplied with the power.

Figure 19:
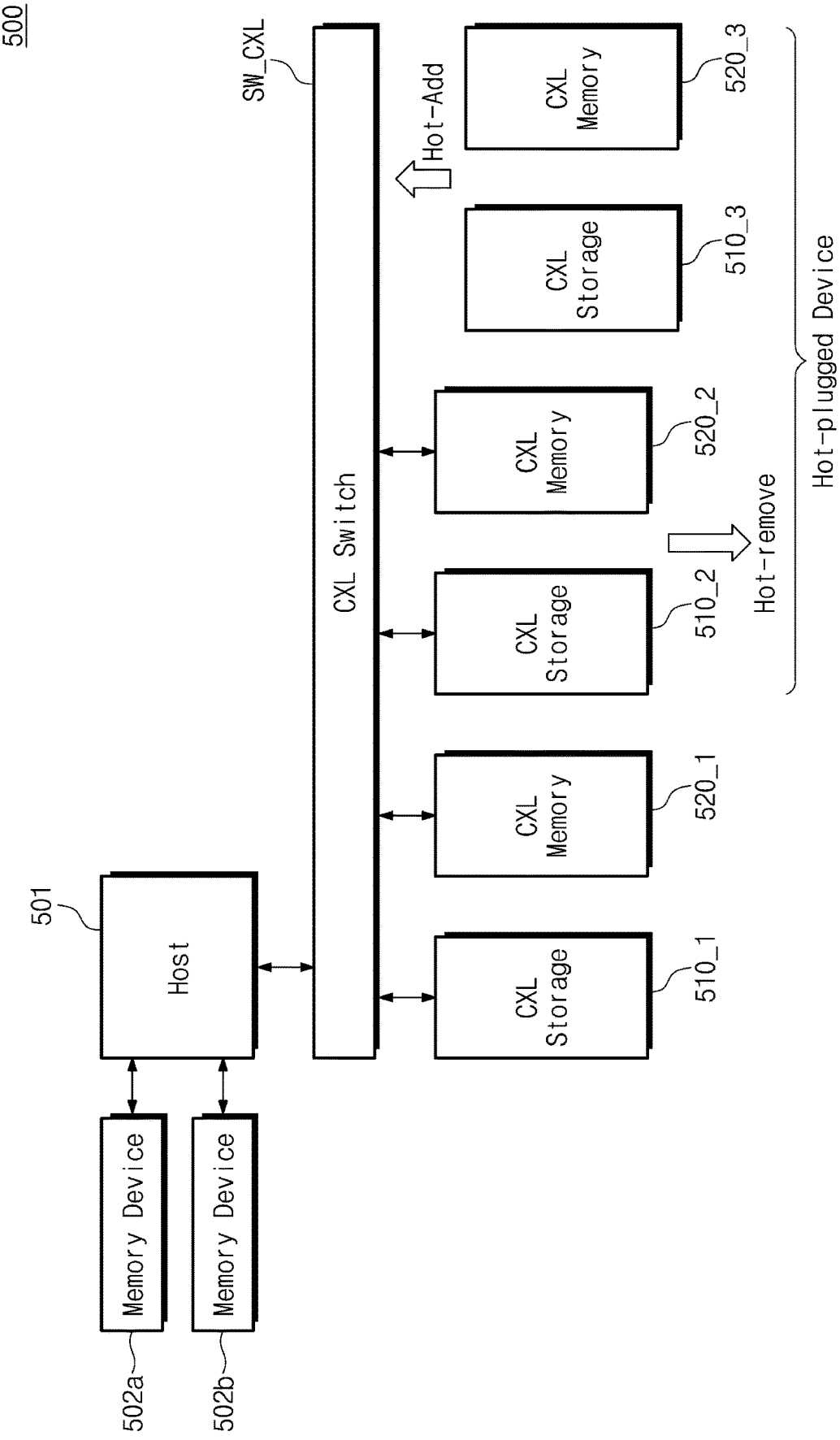
FIG. 19 is a block diagram illustrating a computing system according to an embodiment.

FIG. 19 is a block diagram illustrating a computing system according to an embodiment. Below, for convenience of description, additional description associated with the components described above will be omitted to avoid redundancy. Referring to FIG. 19, a computing system 500 may include a host 501, a plurality of memory devices 502a and 502b, the CXL switch SW_CXL, a plurality of CXL storages 510_1, 510_2, and 510_3, and a plurality of CXL memories 520_1, 520_2, and 520_3.

The host 501 may be directly connected with the plurality of memory devices 502a and 502b. The host 501, the plurality of CXL storages 510_1 and 510_2, and the plurality of CXL memories 520_1 and 520_2 may be connected with the CXL switch SW_CXL and may communicate with each other through the CXL switch SW_CXL. As in the above description, a partial area of the CXL memories 520_1 and 520_2 may be allocated for a dedicated area of the CXL storages 510_1 and 510_2.

In an embodiment, while the computing system 500 is being driven, some of the CXL storages 510_1 and 510_2 or some of the CXL memories 520_1 and 520_2 may be hot-removed from the CXL switch SW_CXL. Alternatively, while the computing system 500 is being driven, the CXL storage 510_3 or the CXL memory 520_3 may be hot-added to the CXL switch SW_CXL. In these cases, the host 501 may again perform memory allocation by again performing the initialization operation on devices connected with the CXL switch SW_CXL through the reset operation or the hot-plug operation. That is, CXL storage and a CXL memory according to an embodiment may support the hot-plug function and may expand a storage capacity and a memory capacity of a computing system through various connections.

In an embodiment, as described with reference to FIGS. 2 to 14, at least one of the plurality of CXL memories 520_1, 520_2, and 520_3 may include the power storage PS. As described with reference to FIG. 15, at least one of the plurality of CXL memories 520_1, 520_2, and 520_3 may be connected with external power storage PS. Two or more CXL memories that do not include the power storage PS may be connected in common with one power storage PS so as to be supplied with the power.

Figure 20:
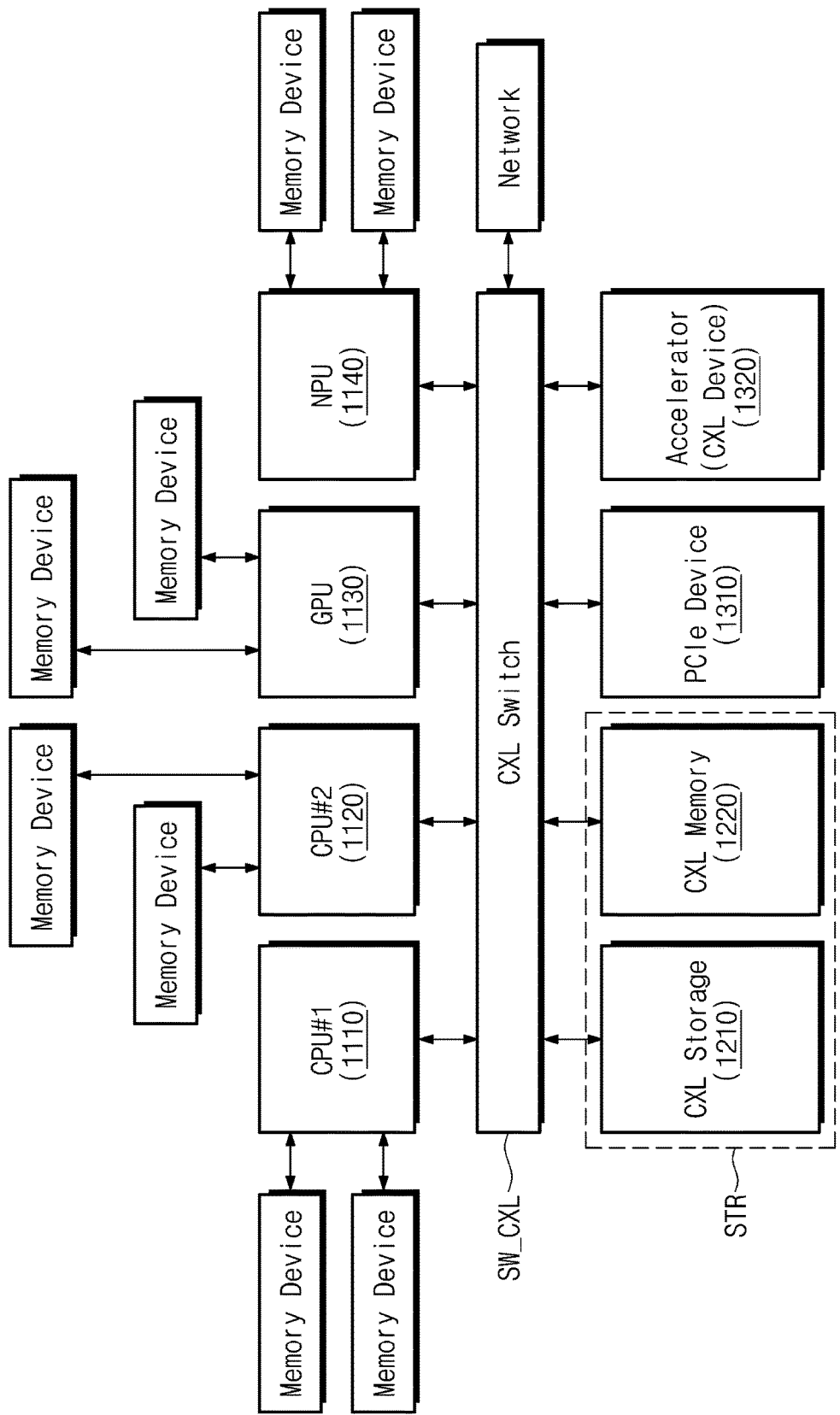
FIG. 20 is a block diagram illustrating a computing system according to an embodiment.

FIG. 20 is a block diagram illustrating a computing system according to an embodiment. For convenience of description, additional description associated with the components described above will be omitted to avoid redundancy. Referring to FIG. 20, a computing system 1000 may include a first CPU 1110, a second CPU 1120, a GPU 1130, an NPU 1140, the CXL switch SW_CXL, CXL storage 1210, a CXL memory 1220, a PCIe device 1310, and an accelerator (CXL device) 1320.

The first CPU 1110, the second CPU 1120, the GPU 1130, the NPU 1140, the CXL storage 1210, the CXL memory 1220, the PCIe device 1310, and the accelerator (CXL device) 1320 may be connected in common with the CXL switch SW_CXL and may communicate with each other through the CXL switch SW_CXL.

In an embodiment, each of the first CPU 1110, the second CPU 1120, the GPU 1130, and the NPU 1140 may correspond to the hosts described with reference to FIGS. 1 to 19 and may be directly connected with individual memory devices.

In an embodiment, the CXL storage 1210 and the CXL memory 1220 may be the CXL storage and the CXL memory described with reference to FIGS. 2 to 19, and at least a partial area of the CXL memory 1220 may be allocated for an area dedicated for the CXL storage 1210 by one or more of the first CPU 1110, the second CPU 1120, the GPU 1130, and the NPU 1140. That is, the CXL storage 1210 and the CXL memory 1220 may be used as a storage space STR of the computing system 1000.

In an embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the storage space STR including the CXL storage 1210 and the CXL memory 1220 through the CXL switch SW_CXL.

In an embodiment, the CXL switch SW_CXL may be connected with an external network or Fabric and may be configured to communicate with an external server through the external network or Fabric.

Figure 21:
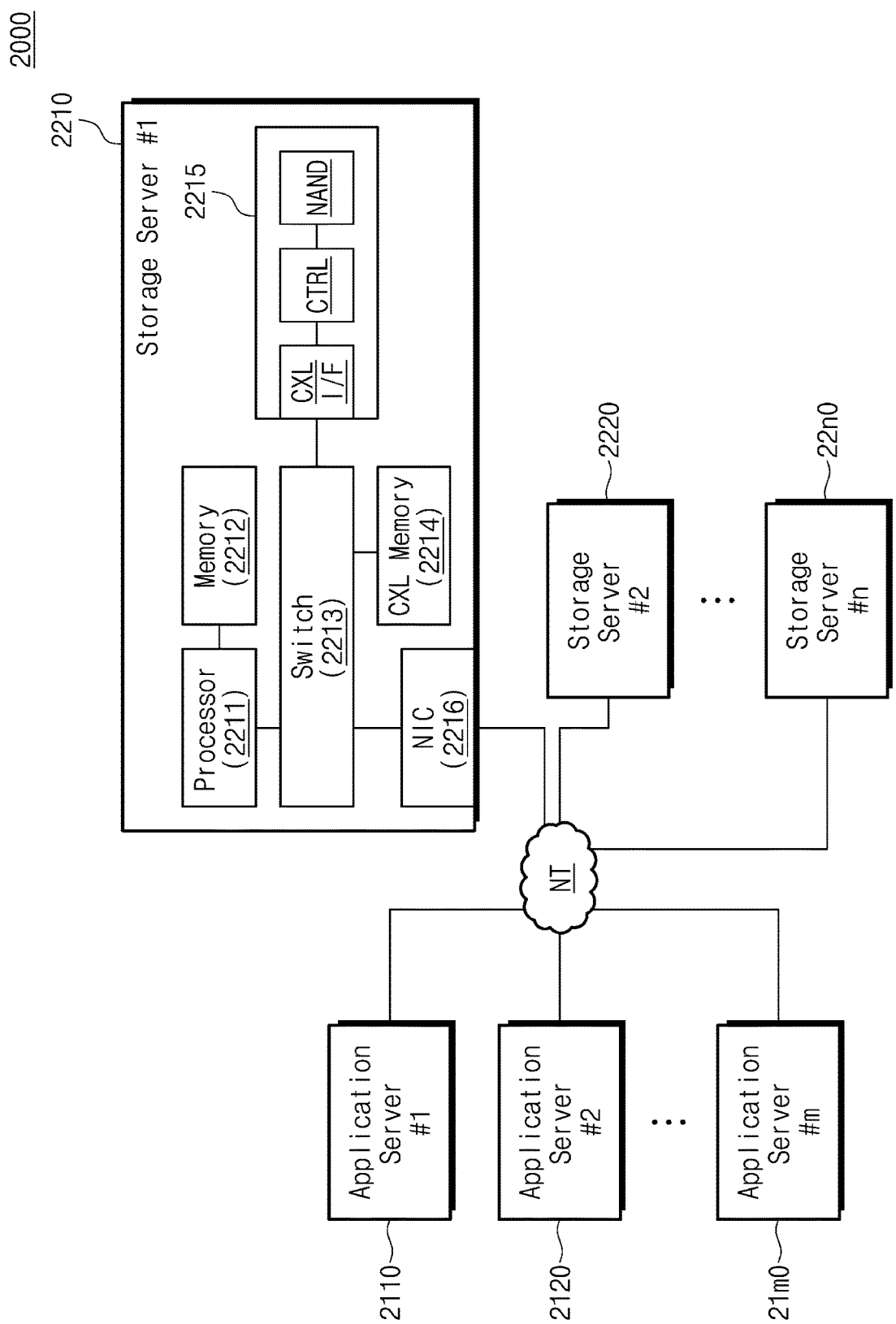
FIG. 21 is a block diagram illustrating a data center according to an embodiment.

FIG. 21 is a block diagram illustrating a data center to which a computing system according to an embodiment is applied. Referring to FIG. 21, a data center 2000 that is a facility collecting various data and providing services may be referred to as a "data storage center". The data center 2000 may be a system for operating a search engine and a database, and may be a computing system used in a business such as a bank or in a government institution. The data center 2000 may include application servers 2110 to 21$m$0 and storage servers 2210 to 22$n$0. The number of application servers and the number of storage servers may be variously selected, and the number of application servers and the number of storage servers may be different from each other.

Below, a configuration of the first storage server 2210 will be mainly described. The application servers 2110 to 21$m$0 may have similar structures, the storage servers 2210 to 22$n$0 may have similar structures, and the application servers 2110 to 21$m$0 and the storage servers 2210 to 22$n$0 may communicate with each other over a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a Double Data Rate Synchronous DRAM (DDR SDRAM), a High Bandwidth Memory (HBM), a Hybrid Memory Cube (HMC), a Dual In-line Memory Module (DIMM), an Optane DIMM, and/or a Non-Volatile DIMM (NVDIMM). The processor 2211 and the memory 2212 may be directly connected, and the numbers of processors and memories included in one storage server 2210 may be variously selected.

In an embodiment, the processor 2211 and the memory 2212 may provide a processor-memory pair. In an embodiment, the number of processors 2211 and the number of memories 2212 may be different from each other. The processor 2211 may include a single core processor or a multi-core processor. The detailed description of the storage server 2210 may be similarly applied to the application servers 2110 to 21$m$0.

The switch 2213 may be configured to arbitrate or route the communications between various components included in the first storage server 2210. In an embodiment, the switch 2213 may be implemented with the CXL switch SW_CXL described with reference to FIGS. 1 to 20. That is, the switch 2213 may be a switch implemented based on the CXL protocol.

The CXL memory 2214 may be connected with the switch 2213. In an embodiment, the CXL memory 2214 may be used as a memory expander for the processor 2211. Alternatively, as described with reference to FIGS. 1 to 20, the CXL memory 2214 may be allocated as a dedicated memory or a buffer memory of the storage device 2215.

The storage device 2215 may include a CXL interface circuit CXL_IF, a controller CTRL, and a NAND flash NAND. According to a request of the processor 2211, the storage device 2215 may store data or may output the stored data. In an embodiment, the storage device 2215 may be implemented with the CXL storage described with reference to FIGS. 1 to 20. In an embodiment, as in the description given with reference to FIGS. 1 to 20, at least a partial area of the CXL memory 2214 may be allocated for a dedicated area of the storage device 2215, and the dedicated area may be used as a buffer memory (i.e., may be used to store map data in the CXL memory 2214).

According to an embodiment, the application servers 2110 to 21m0 may not include the storage device 2215. The storage server 2210 may include at least one or more storage devices 2215. The number of storage devices 2215 included in the storage server 2210 may be variously selected.

The NIC 2216 may be connected with the CXL switch SW_CXL. The NIC 2216 may communicate with the remaining storage servers 2220 to 22n0 or the application servers 2110 to 21m0 over the network NT.

In an embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc. and may be connected with the processor 2211 and/or the switch 2213 through the host bus interface. In an embodiment, the NIC 2216 may be integrated with at least one of the processor 2211, the switch 2213, and the storage device 2215.

In an embodiment, the network NT may be implemented by using a Fibre channel (FC) or an Ethernet. In this case, the FC may be a medium that is used in high-speed data transmission and may use an optical switch that provides high performance/high availability. Storage servers may be provided as file storage, block storage, or object storage according to an access manner of the network NT.

In an embodiment, the network NT may be a storage-dedicated network such as a storage area network (SAN). For example, the SAN may be a FC-SAN that uses a FC network and is implemented according to a FC protocol (FCP). For another example, the SAN may be an IP-SAN that uses a TCP/IP network and is implemented according to an iSCSI (SCSI over TCP/IP or Internet SCSI). In an embodiment, the network NT may be a legacy network such as a TCP/IP network. For example, the network NT may be implemented according to the following protocol: FC over Ethernet (FCoE), Network Attached Storage (NAS), or NVMe over Fabrics (NVMe-oF).

In an embodiment, at least one of the application servers 2110 to 21m0 may store data, which are store-requested by a user or a client, in one of the storage servers 2210 to 22n0 over the network NT. At least one of the application servers 2110 to 21m0 may obtain data, which are read-requested by the user or the client, from one of the storage servers 2210 to 22n0 over the network NT. For example, at least one of the application servers 2110 to 21m0 may be implemented with a web server, a database management system (DBMS), etc.

In an embodiment, at least one of the application servers 2110 to 21m0 may access a memory, a CXL memory, or a storage device included in any other application server over the network NT or may access memories, CXL memories, or storage devices included in the storage servers 2210 to 22n0 over the network NT. As such, at least one of the application servers 2110 to 21m0 may perform various operations on data stored in the remaining application servers and/or storage servers. For example, at least one of the application servers 2110 to 21m0 may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In an embodiment, a CXL memory included in at least one of the application servers 2110 to 21m0 and the storage servers 2210 to 22n0 may be allocated for a dedicated area of a storage device included in at least one of the application servers 2110 to 21m0 and the storage servers 2210 to 22n0, and the storage device may use the dedicated area thus allocated as a buffer memory (i.e., may store map data in the dedicated area). For example, a CXL memory included in a storage server (e.g., 22n0) may be allocated to the storage device 2215 included in the storage server 2210, and the storage device 2215 included in the storage server 2210 may access the CXL memory included in the storage server (e.g., 22n0) over the switch 2213 and the NIC 2216. In this case, the map data associated with the storage device 2215 of the first storage server 2210 may be stored in the CXL memory of the storage server 22n0. That is, storage devices and CXL memories of a data center according to the present disclosure may be connected and implemented in various manners.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to exemplary embodiments thereof, it will be apparent to those of ordinary skill in the art that various changes and modifications may be made thereto without departing from the spirit and scope as set forth in the following claims. In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

According to the present disclosure, map data may be stored in a memory device separated from a storage device. Accordingly, a large amount of map data may be used without costs for separate research and development. According to the present disclosure, map data stored in a separated memory device may be backed up to a nonvolatile memory of the separated memory device. Accordingly, the map data may be recovered even in sudden power-off.

While aspects of embodiments have been particularly shown and described, it will be understood that various changes in form and details may be made therein without departing from the spirit and scope of the following claims.

What is claimed is:

1. A memory device comprising:
   a buffer memory;
   a nonvolatile backup memory; and
   a memory controller configured to:
      store map data corresponding to an external storage device in the buffer memory;
      provide, in response to a request from the external storage device, an address pair corresponding to the request, from among address pairs of the map data, to the external storage device; and
      back up, in response to a sudden power-off event, the map data to the nonvolatile backup memory.

2. The memory device of claim 1, wherein the memory controller is configured to, in response to the sudden power-off event, record a device identifier of the external storage device corresponding to the map data and addresses of the buffer memory, at which the map data are stored.

3. The memory device of claim 2, wherein the memory controller is configured to, based on power being turned on after the sudden power-off event, provide an external host with the device identifier and the addresses in response to a request from the external host.

4. The memory device of claim 2, wherein the memory controller is configured to, based on power being turned on after the sudden power-off event:
   read the map data stored in the nonvolatile backup memory; and
   store the map data read from the nonvolatile backup memory in a storage space of the buffer memory corresponding to the addresses.

5. The memory device of claim 4, wherein the memory controller is configured to, based on the power being turned on after the sudden power-off event, in response to the request from the external storage device:
   read the map data stored in the buffer memory; and
   send the map data read from the buffer memory to the external storage device.

6. The memory device of claim 2, wherein the memory controller is connected with a detachable power storage, and
   wherein the memory controller is configured to, in response to the sudden power-off event being detected, back up the map data in the nonvolatile backup memory by using the detachable power storage.

7. The memory device of claim 1, wherein the memory controller is configured to, in response to a typical power-off:
   read the map data from the buffer memory; and
   send the map data read from the buffer memory to the external storage device.

8. The memory device of claim 7, wherein the memory controller is configured to, in response to the typical power-off and the request from the external storage device, provide the map data read from the buffer memory to the external storage device and to then perform power-off with the map data present in the buffer memory.

9. The memory device of claim 8, wherein the memory controller is configured to, based on power being turned on after the typical power-off, store the map data from the external storage device in the buffer memory.

10. A storage device comprising:
    a nonvolatile memory configured to store user data and map data; and
    a storage controller configured to:
       read the map data from the nonvolatile memory;
       send the map data read from the nonvolatile memory to an external memory device;
       request an address pair, for access to the nonvolatile memory, from among address pairs of the map data to the external memory device from the external memory device; and
       based on power being turned on after a sudden power-off, request the map data from the external memory device.

11. The storage device of claim 10, wherein the storage controller is configured to, based on the power being turned on after the sudden power-off, update the map data stored in the nonvolatile memory by using the map data from the external memory device.

* * * * *